US012346305B2

(12) United States Patent
Jun et al.

(10) Patent No.: US 12,346,305 B2
(45) Date of Patent: Jul. 1, 2025

(54) ELECTRONIC DEVICE FOR RECOVERING DATABASE AND METHOD OF OPERATING THE SAME

(71) Applicant: Samsung Electronics Co., Ltd., Suwon-si (KR)

(72) Inventors: Hyeeun Jun, Suwon-si (KR); Kisung Lee, Suwon-si (KR); Yoonho Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 75 days.

(21) Appl. No.: 17/994,229

(22) Filed: Nov. 25, 2022

(65) Prior Publication Data

US 2023/0153291 A1 May 18, 2023

Related U.S. Application Data

(63) Continuation of application No. PCT/KR2022/015546, filed on Oct. 14, 2022.

(30) Foreign Application Priority Data

Nov. 15, 2021 (KR) .......................... 10-2021-0156549
Nov. 30, 2021 (KR) .......................... 10-2021-0168020

(51) Int. Cl.
*G06F 16/23* (2019.01)
*G06F 16/2455* (2019.01)

(52) U.S. Cl.
CPC .... *G06F 16/2365* (2019.01); *G06F 16/24552* (2019.01); *G06F 2201/80* (2013.01)

(58) Field of Classification Search
CPC ........... G06F 16/2365; G06F 16/24552; G06F 2201/80
See application file for complete search history.

(56) References Cited

U.S. PATENT DOCUMENTS 8,364,648 B1 * 1/2013 Sim-Tang ............... G06F 16/20
707/674
8,484,616 B1 * 7/2013 McCann ................... G06F 8/20
717/106
(Continued)

FOREIGN PATENT DOCUMENTS

JP 2007/272493 A 10/2007
JP 2013/222467 A 10/2013
(Continued)

OTHER PUBLICATIONS

Kaczmarek et al., "Operating system security by integrity checking and recovery using writeprotected storage," IET Information Security, vol. 8, Issue 2, pp. 122-131, Mar. 1, 2014.
(Continued)

*Primary Examiner* — Vaishali Shah
(74) *Attorney, Agent, or Firm* — Jefferson IP Law, LLP

(57) ABSTRACT

An electronic device for recovering a database (DB) and a method of operating the electronic device are provided. The electronic device includes a non-volatile first memory configured to store a DB, a volatile second memory, and a processor operably connected to the first memory and the second memory. The processor may determine whether the DB is corrupted, may perform first integrity check of the DB after initializing a DB cache in which at least a portion of the DB is loaded to a user space of the second memory when it is determined that the DB is corrupted, may perform second integrity check of the DB after initializing an operating system (OS) cache in which at least a portion of the DB is loaded to a kernel space of the second memory when the first integrity check of the DB fails, and may perform a task on a DB file when the first integrity check or the second integrity check of the DB is successful.

18 Claims, 15 Drawing Sheets

(56) References Cited

U.S. PATENT DOCUMENTS

| | | | | |
|---|---|---|---|---|
| 10,013,439 | B2* | 7/2018 | Gruenheid | G06F 16/214 |
| 12,093,726 | B2* | 9/2024 | Li | G06F 9/449 |
| 2005/0015456 | A1* | 1/2005 | Martinson, Jr. | H04L 51/212 |
| | | | | 709/207 |
| 2005/0246453 | A1* | 11/2005 | Erlingsson | G06F 9/45558 |
| | | | | 710/1 |
| 2007/0061266 | A1* | 3/2007 | Moore | G06Q 50/00 |
| | | | | 705/51 |
| 2017/0351584 | A1* | 12/2017 | Griffith | G06F 16/2358 |
| 2018/0172468 | A1* | 6/2018 | Sagall | G01C 21/26 |
| 2018/0173744 | A1* | 6/2018 | Barbas | G06F 16/2365 |
| 2018/0359090 | A1* | 12/2018 | Grover | H04L 9/0631 |
| 2019/0236168 | A1* | 8/2019 | Vaswani | G06F 16/2358 |
| 2019/0379621 | A1* | 12/2019 | Ichikawa | G06Q 10/107 |
| 2020/0073832 | A1 | 3/2020 | Chaiken et al. | |
| 2021/0149795 | A1* | 5/2021 | Kapusta | G06F 11/073 |
| 2022/0197796 | A1* | 6/2022 | Rumanek | G06F 12/0811 |

FOREIGN PATENT DOCUMENTS

| | | |
|---|---|---|
| KR | 10-2007-0058281 A | 6/2007 |
| KR | 10-2008-0058834 A | 6/2008 |
| KR | 10-2010-0126069 A | 12/2010 |
| KR | 10-1484882 B1 | 1/2015 |
| KR | 10-1575246 A | 12/2015 |
| KR | 10-2017-0133778 A | 12/2017 |
| KR | 10-2019-0021773 A | 3/2019 |
| KR | 10-2020-0101217 A | 8/2020 |

OTHER PUBLICATIONS

International Search Report dated Jan. 19, 2023, issued in International Application No. PCT/KR2022/015546.

Anonymous; Oracle Database Concepts; Data Integrity; 10g Release 2 (10.2); XP055277132; http://wayback.archive.org/web/20111120011731/http://docs.oracle.com/cd/B19306_01/server.102/b14220/data _ int.htm.

Nervag; The Vagabond Approach to Logging and Recovery in Transaction-Time Temporal Object Database Systems; IEEE Transactions on Knowledge and Data Engineering; vol. 16. No. 4; Apr. 2004; XP011108190; Apr. 1, 2004; Alamitos, CA, US.

Extended European Search Report dated Sep. 18, 2024; European Appln. No. 22893042.6-1203 / 4345624 PCT/KR2022015546.

* cited by examiner

ELECTRONIC DEVICE FOR RECOVERING DATABASE AND METHOD OF OPERATING THE SAME

CROSS-REFERENCE TO RELATED APPLICATION(S)

This application is a continuation application, claiming priority under § 365(c), of an International application No. PCT/KR2022/015546, filed on Oct. 14, 2022, which is based on and claims the benefit of a Korean patent application number 10-2021-0156549, filed on Nov. 15, 2021, in the Korean Intellectual Property Office, and of a Korean patent application number 10-2021-0168020, filed on Nov. 30, 2021, in the Korean Intellectual Property Office, the disclosure of each of which is incorporated by reference herein in its entirety.

BACKGROUND

1. Field

The disclosure relates to an electronic device for restoring a database (DB) and a method of operating the electronic device.

2. Description of Related Art

With the recent development of digital technologies, various types of electronic devices such as mobile communication terminals, smartphones, tablet personal computers (PCs), electronic notebooks, personal digital assistants (PDAs), wearable devices, and the like, are being widely used. An electronic device may manage data of one or more applications, services, and/or operating systems (OSs) based on a database (DB). For example, the electronic device may process data in the DB, based on a running application, service, and/or OS.

The above information is presented as background information only to assist with an understanding of the disclosure. No determination has been made, and no assertion is made, as to whether any of the above might be applicable as prior art with regard to the disclosure.

SUMMARY

During an operation of an electronic device, a database (DB) may be corrupted due to various causes, such as unexpected system or hardware errors, or application or runtime library errors. A DB engine used in the Android™ OS may be SQLite. Due to characteristics of the DB, if a header or schema is broken, an access to the DB itself may be impossible due to impossibility to access important metadata. If a portion of data in the DB is corrupted, it may also be impossible to access the other data, and the DB may be initialized. If the DB is initialized, all important user data such as contacts, messages, and notes may also be lost.

According to embodiments of the disclosure, when a DB is corrupted, a scheme of recovering the DB at runtime on an Android device may be provided. Through a runtime DB recovery scheme, a user may be guaranteed to use a corresponding application and/or data without a loss of important data.

Aspects of the disclosure are to address at least the above-mentioned problems and/or disadvantages and to provide at least the advantages described below. Accordingly, an aspect of the disclosure is to provide an electronic device for restoring a database (DB) and a method of operating the electronic device.

Additional aspects will be set forth in part in the description which follows and, in part, will be apparent from the description, or may be learned by practice of the presented embodiments.

In accordance with an aspect of the disclosure, an electronic device is provided. The electronic device includes a non-volatile first memory configured to store a DB, a volatile second memory, and a processor operably connected to the first memory and the second memory. The processor may be configured to determine whether the DB is corrupted, to perform a first integrity check of the DB after initializing a DB cache in which at least a portion of the DB is loaded to a user space of the second memory when it is determined that the DB is corrupted, to perform a second integrity check of the DB after initializing an operating system (OS) cache in which at least a portion of the DB is loaded to a kernel space of the second memory when the first integrity check of the DB fails, and to perform a task on a DB file when the first integrity check or the second integrity check is successful.

In accordance with another aspect of the disclosure, a method of operating an electronic device is provided. The method includes determining whether a DB stored in a non-volatile first memory of the electronic device is corrupted, performing a first integrity check of the DB after initializing a DB cache in which at least a portion of the DB is loaded to a user space of a volatile second memory of the electronic device, when it is determined that the DB is corrupted, performing a second integrity check of the DB after initializing an OS cache in which at least a portion of the DB is loaded to a kernel space of the second memory, when the first integrity check of the DB fails, and performing a task on a DB file, when the first integrity check or the second integrity check of the DB is successful.

According to embodiments, when a DB is corrupted, an advanced integrity verification-based recovery scheme, a backup metadata recovery scheme, a template recovery scheme, and other recovery schemes may be sequentially performed, to recover the corrupted DB normally or prevent a loss of data.

In addition, according to embodiments, a scheme of recovering a DB at runtime on an Android device when the DB is corrupted may be provided, and thus a user may be guaranteed to use a corresponding application and/or data without a loss of important data.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
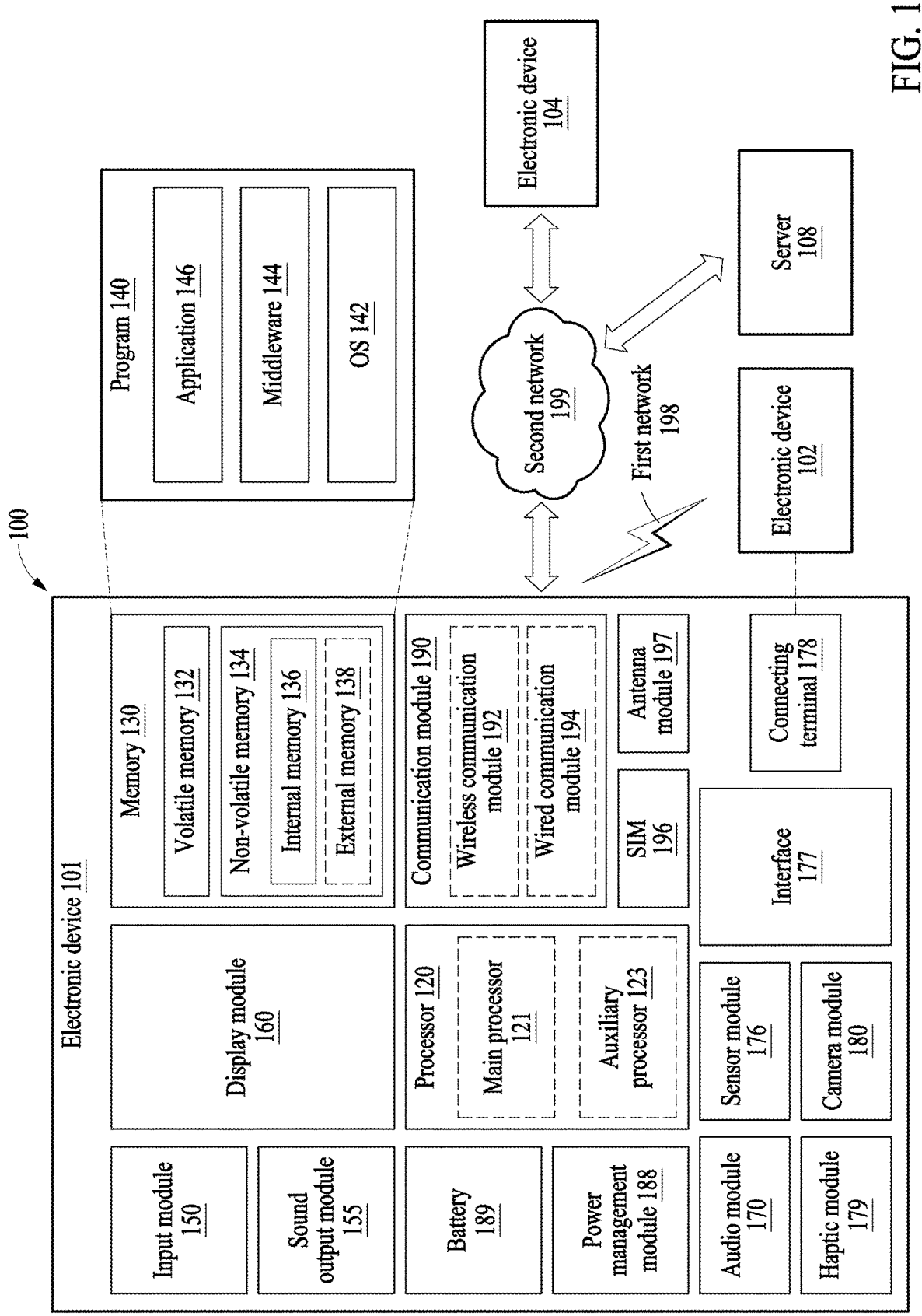
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to one embodiment, the electronic device 101 may communicate with the electronic device 104 via the server 108. According to one embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added to the electronic device 101. In some embodiments, some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to one embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to one embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to one embodiment, the auxiliary processor 123 (e.g., an ISP or a CP) may be implemented as a portion of another component (e.g., the camera module 180 or the communication module 190) that is functionally related to the auxiliary processor 123. According to one embodiment, the auxiliary processor 123 (e.g., an NPU) may include a hardware structure specified for artificial intelligence model processing. An artificial intelligence model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to one embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to one embodiment, the display module 160 may include a touch sensor adapted to detect a touch, or a pressure sensor adapted to measure the intensity of force incurred by the touch.

The audio module 170 may convert a sound into an electric signal or vice versa. According to one embodiment, the audio module 170 may obtain the sound via the input module 150 or output the sound via the sound output module 155 or an external electronic device (e.g., the electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to one embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly. According to one embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to one embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to one embodiment, the haptic module 179 may include, for example, a motor, a piezoelectric element, or an electric stimulator.

The camera module 180 may capture a still image and moving images. According to one embodiment, the camera module 180 may include one or more lenses, image sensors, image signal processors, or flashes.

The power management module 188 may manage power supplied to the electronic device 101. According to one embodiment, the power management module 188 may be implemented as, for example, at least a part of a power management integrated circuit (PMIC).

The battery 189 may supply power to at least one component of the electronic device 101. According to one embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently of the processor 120 (e.g., an application processor (AP)) and that support a direct (e.g., wired) communication or a wireless communication. According to one embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a $5^{th}$ generation (5G) network, a next-generation communication network, the Internet, or a computer network (e.g., a LAN or a wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a millimeter (mm) Wave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large-scale antenna. The wireless communication module 192 may support various requirements specified in the electronic device 101, an external electronic device (e.g., the electronic device 104), or a network system (e.g., the second network 199). According to one embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to one embodiment, the antenna module 197 may include an antenna including a radiating element including a conductive material or a conductive pattern formed in or on a substrate (e.g., a printed circuit board (PCB)). According to one embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to one embodiment, another component (e.g., a radio frequency integrated circuit (RFIC)) other than the radiating element may be additionally formed as a part of the antenna module 197.

According to various embodiments, the antenna module 197 may form a mmWave antenna module. According to one embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to one embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to one embodiment, all or some of operations to be executed by the electronic device 101 may be executed at one or more external electronic devices (e.g., the external devices 102 and 104, and the server 108). For example, if the electronic device 101 needs to perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In one embodiment, the external electronic device 104 may include an Internet-of-things (IoT) device. The server 108 may be an intelligent server using machine learning and/or a neural network. According to one embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
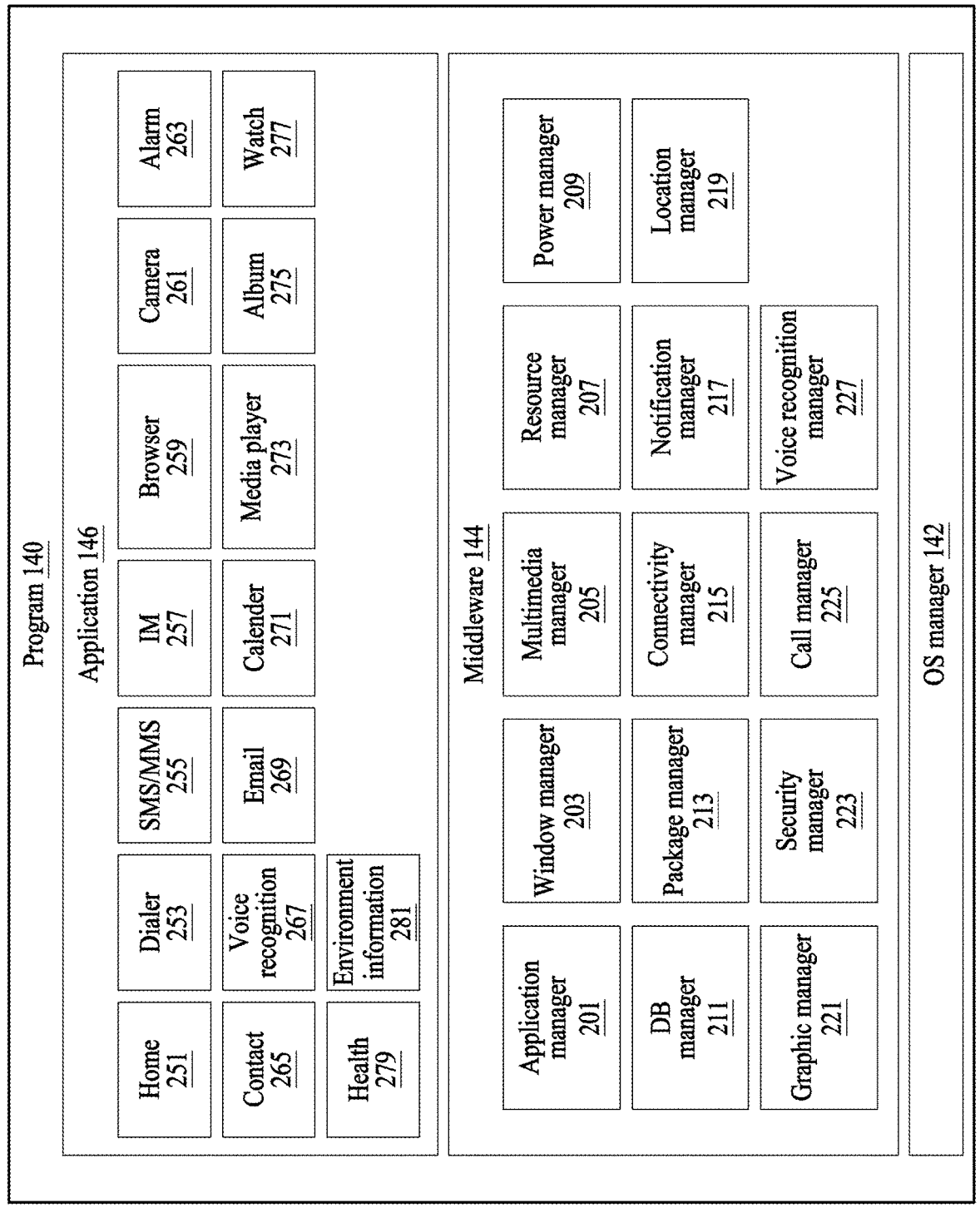
FIG. 2 is a block diagram illustrating a program according to an embodiment of the disclosure.

FIG. 2 is a block diagram illustrating a program according to an embodiment of the disclosure.

Referring to FIG. 2, it is a block diagram 200 illustrating a program 140 according to one embodiment. According to one embodiment, the program 140 may include an OS 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., alposition or dealposition) of one or more system resources (e.g., a process, a memory, or a power source) of the electronic device 101. The OS 142 may additionally or alternatively include other one or more driver programs to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the SIM 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database (DB) manager 211, a package manager 213, a connectivity manager 215, a notification manager 217, a location manager 219, a graphic manager 221, a security manager 223, a telephony manager 225, or a voice recognition manager 227.

The application manager 201 may, for example, manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and may determine or provide related information to be used for the operation of the electronic device 101 based on at least in part on corresponding information of the capacity, temperature, or power of the battery 189. According to one embodiment, the power manager 209 may interwork with a basic input/output system (BIOS) (not shown) of the electronic device 101.

The DB manager 211, for example, may generate, search, or change a DB to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, a message, or an alert). The location manager 219, for example, may manage location information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit user's voice data to the server 108, and may receive, from the server 108, a command corresponding to a function to be executed on the electronic device 101 based on at least in part on the voice data, or text data converted based on at least in part on the voice data. According to one embodiment, the middleware 144 may dynamically delete some existing components or add new components. According to one embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to one embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control a power source (e.g., turning on or off) or a function (e.g., brightness, resolution, or focus) of an external electronic device that communicates with the electronic device 101 or a portion of components of the external electronic device (e.g., a display module or a camera module). The device management application may additionally or alternatively support installation, deletion, or update of an application that operates in an external electronic device.

The electronic device according to various embodiments may be one of various types of electronic devices. The electronic device may include, for example, a portable communication device (e.g., a smartphone), a computer device, a portable multimedia device, a portable medical device, a camera, a wearable device, or a home appliance device. According to one embodiment of the disclosure, the electronic device is not limited to those described above.

It should be appreciated that various embodiments of the disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "at least one of A, B, or C," each of which may include any one of the items listed together in the corresponding one of the phrases, or all possible combinations thereof. Terms such as "first", "second", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used in connection with one embodiment of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to one embodiment, the module may be implemented in a form of an application-specific integrated circuit (ASIC).

Various embodiments as set forth herein may be implemented as software (e.g., the program 140) including one or more instructions that are stored in a storage medium (e.g., the internal memory 136 or the external memory 138) that is readable by a machine (e.g., the electronic device 101) For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method according to various embodiments of the disclosure may be included and provided in a computer program product. The computer program product may be traded as a product between a seller and a buyer. The computer program product may be distributed in the form of a machine-readable storage medium (e.g., compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to one embodiment, one or more of the above-described components may be omitted, or one or more other components may be added. Alternatively or additionally, a plurality of components (e.g., modules or programs) may be integrated into a single component. In such a case, according to one embodiment, the integrated component may still perform one or more functions of each of the plurality of components in the same or similar manner as they are performed by a corresponding one of the plurality of components before the integration. According to one embodiment, operations performed by the module, the program, or another component may be carried out sequentially, in parallel, repeatedly, or heuristically, or one or more of the operations may be executed in a different order or omitted, or one or more other operations may be added.

Figure 3:
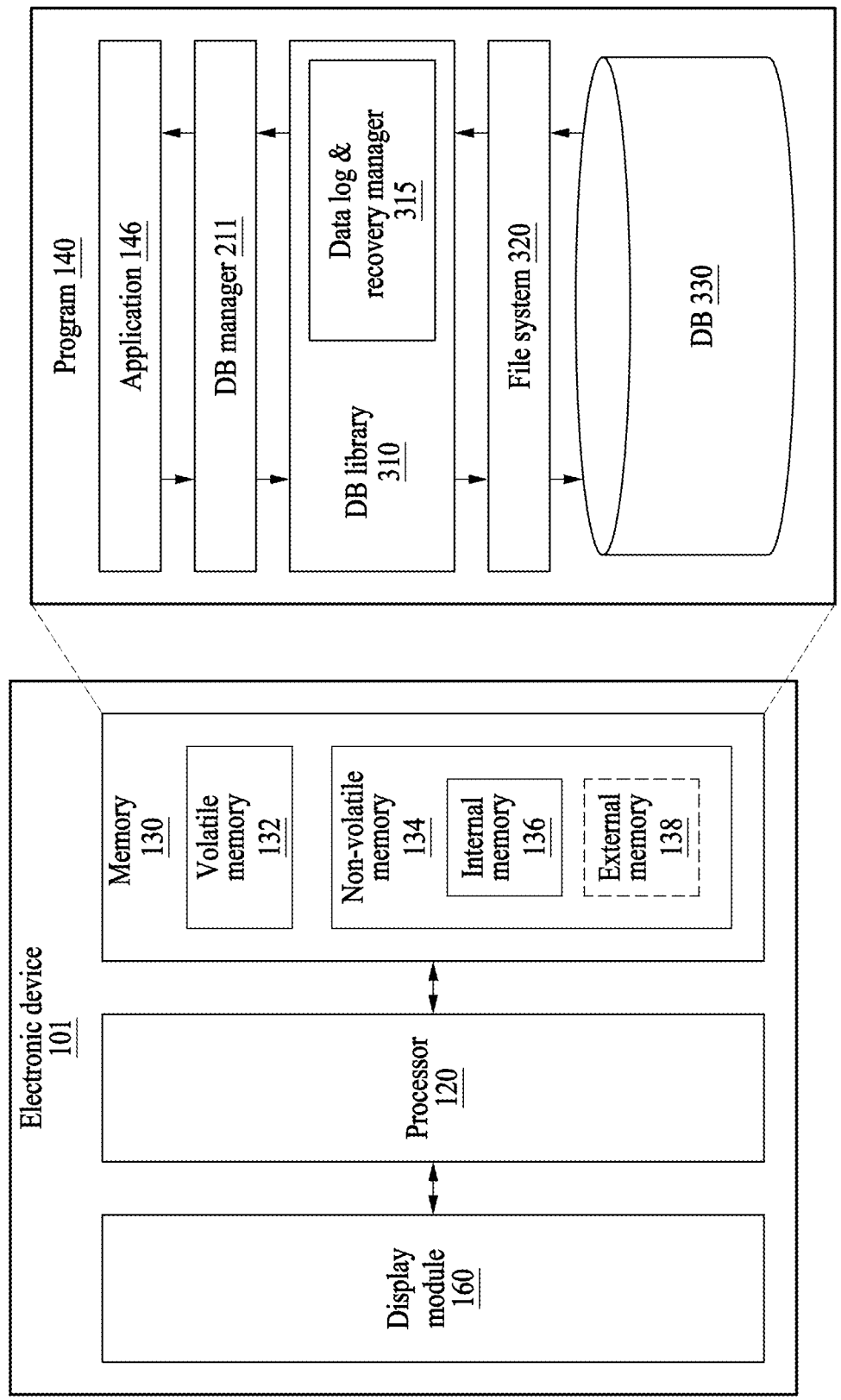
FIG. 3 is a diagram illustrating an operation related to a database (DB) stored in an electronic device according to an embodiment of the disclosure.

FIG. 3 is a diagram illustrating an operation related to a DB stored in an electronic device according to an embodiment of the disclosure.

Referring to FIG. 3, an electronic device 101 may correspond to, for example, at least one of a smartphone, a smart pad, a tablet personal computer (PC), a personal digital assistant (PDA), a laptop PC, or a desktop PC. The electronic device 101 may correspond to, for example, a wearable device including at least one of accessories (e.g., watches, rings, bracelets, ankle bracelets, necklaces, glasses, contact lenses, or head-mounted device (HMDs)), fabric- or clothing-mounted devices (for example, electronic apparels), body-mounted devices (e.g., skin pads or tattoos), or implantable devices (e.g., implantable circuits). The electronic device 101 may be, for example, a home appliance such as a refrigerator, a television (TV), a cleaner, an air-conditioner, a washing machine, or a lighting device. The electronic device 101 may include a processor 120, a memory 130, and a display module 160. The electronic device 101 may be, at least in part, identical to the electronic device 101 shown in FIG. 1.

According to one embodiment, the processor 120 may execute one or more instructions stored in the memory 130. The processor 120 may include a circuit for processing data, for example, at least one of an integrated circuit (IC), an arithmetic logic unit (ALU), a field programmable gate array (FPGA), or a large-scale integration (LSI). The memory 130 may store data related to the electronic device 101. The memory 130 may include a volatile memory 132, such as a random access memory (RAM) including a static random access memory (SRAM), a dynamic RAM (DRAM), or the like, or may include a non-volatile memory 134, such as a flash memory, an embedded multimedia card (eMMC), a solid state drive (SSD), or the like, as well as a read-only memory (ROM), a magnetoresistive RAM (MRAM), a spin-transfer torque MRAM (STT-MRAM), a phase-change RAM (PRAM), a resistive RAM (RRAM), and a ferroelectric RAM (FeRAM). The non-volatile memory 134 may be in the form of an internal memory 136 included in the electronic device 101, and/or in the form of an external memory 138 detachable from the electronic device 101.

According to one embodiment, the memory 130 may store instructions related to an application 146 and instructions related to an OS (e.g., the OS 142 of FIG. 1). The OS may be system software executed by the processor 120. The processor 120 may manage hardware components (e.g., the memory 130 of FIG. 1 to the antenna module 197 of FIG. 1) included in the electronic device 101 by executing the OS. The OS may provide application programming interfaces (APIs) to the application 146 that is software other than system software.

According to one embodiment, one or more applications 146 that are a set of a plurality of instructions may be installed in the memory 130. The installation of the application 146 in the memory 130 may indicate that the application 146 is stored in a format executable by the processor 120 connected to the memory 130.

According to one embodiment, the display module 160 may visually output information to a user using at least one of an organic light-emitting diode (OLED), a liquid crystal display (LCD), and a light emitting diode (LED). In order to more intuitively control a user interface (UI) output through the display module 160, the electronic device 101 may include a touch screen panel (TSP) (not shown) disposed on the display module 160. Touch sensor panels may detect a position of an object (e.g., a user's finger, and a stylus) that touches the display module 160 or hovers over the display module 160 using at least one of a resistive film, capacitive components, surface acoustic waves, and infrared rays.

FIG. 3 illustrates a program 140 according to one embodiment. The program 140 may include a DB manager 211 and/or a DB library 310 that provides a function of processing data between the application 146 and a DB 330. The DB library 310 may be included in middleware (e.g., the middleware 144 of FIGS. 1 and 2). The middleware may provide various functions to the application 146 such that functions or information provided from one or more resources of the electronic device 101, such as the DB 330, may be used by the application 146. The electronic device 101 may generate, retrieve, or modify the DB 330 by the application 146, based on the DB manager 211 and/or the DB library 310.

According to one embodiment, the DB library 310 may include a data log & recovery manager 315 configured to manage modified data of the DB 330 based on the application 146 and detect an error related to modification of the data, thereby restoring the data. For example, when a function of processing or modifying data of the DB 330, which is included in the DB library 310, is executed based on the application 146 running in the electronic device 101, the electronic device 101 may access the data included in the DB 330 via a file system 320. If the data is transferred from the file system 320 to the application 146, the electronic device 101 may ensure consistency and/or integrity of the data based on the data log & recovery manager 315.

The electronic device 101 according to one embodiment may manage data stored in a storage using, for example, the non-volatile memory 134, based on the file system 320. For example, the electronic device 101 may manage a position at which data (e.g., a file) is stored in the DB 330 using the file system 320. The file system 320 may be included in the OS. The electronic device 101 may set at least a portion of the volatile memory 132 and/or the non-volatile memory 134 of the memory 130 as a storage. The storage may correspond to a storage area in which data related to the electronic device 101 is stored. Hereinafter, a memory may refer to a portion of the volatile memory 132 and/or the non-volatile memory 134, which is distinguished from a storage area. For example, the memory may correspond to a work area for processing data related to the electronic device 101. The electronic device 101 according to one embodiment may manage data related to the application 146, based on the DB 330. The DB 330, which is a set of systematized data, may refer to a set of data stored in a storage, based on a specified list or data structure. Almost all applications and services installed in the electronic device 101 may operate based on the DB 330. In this case, a plurality of different applications and services may frequently access the DB 330 while the electronic device 101 is operating. A number of DBs 330 stored in the storage of the electronic device 101 is not limited to the embodiment illustrated in FIG. 3, and a plurality of DBs may be provided.

According to one embodiment, in order for the electronic device 101 to execute the application 146 without an error, the electronic device 101 may ensure data integrity for maintaining data stored in the DB 330 in a normal state at all times and atomicity of transactions related to the DB 330. The atomicity may indicate that results obtained by computing data in the DB 330, based on all operations included in one transaction, are all reflected to the DB 330 or are not reflected to the DB 330 at all.

According to one embodiment, a corresponding transaction may indicate a unit of an operation performed to change a state of the DB 330. In one embodiment, a transaction, which is a logical unit of work (LUW) for operations related to data in the DB 330, may be a unit of interaction between the application 146 and the DB 330. An operation related to data of the DB 330 may be, for example, an operation of accessing the DB 330, based on a structured query language (SQL) such as "OPEN", "SELECT", "INSERT", "DELETE", "UPDATE", and "CLOSE". In one embodiment, one transaction may be a set of one or more operations and/or SQLs related to data in the DB 330. In one embodiment, operations included in the transaction and related to data in the DB 330 may include an operation of reading data, an operation of adding data, an operation of deleting data, and an operation of modifying data. A commitment of the transaction may indicate that all operations related to data, which are included in the transaction, have been successfully performed.

The electronic device 101 according to one embodiment may ensure the integrity and atomicity of data in the DB 330, based on the DB manager 211 and/or the data log & recovery manager 315. For example, the electronic device 101 may manage the modified data of the DB 330, based on a journal scheme, thereby ensuring the integrity and atomicity of data in the DB 330. The journal scheme may include a write-ahead logging (WAL) scheme and/or a roll-back scheme.

In one embodiment, the electronic device 101 may include a DB 330 based on SQLite. The electronic device 101 may ensure atomicity of transactions by accessing the DB 330 based on SQLite according to the WAL scheme.

Figure 4:
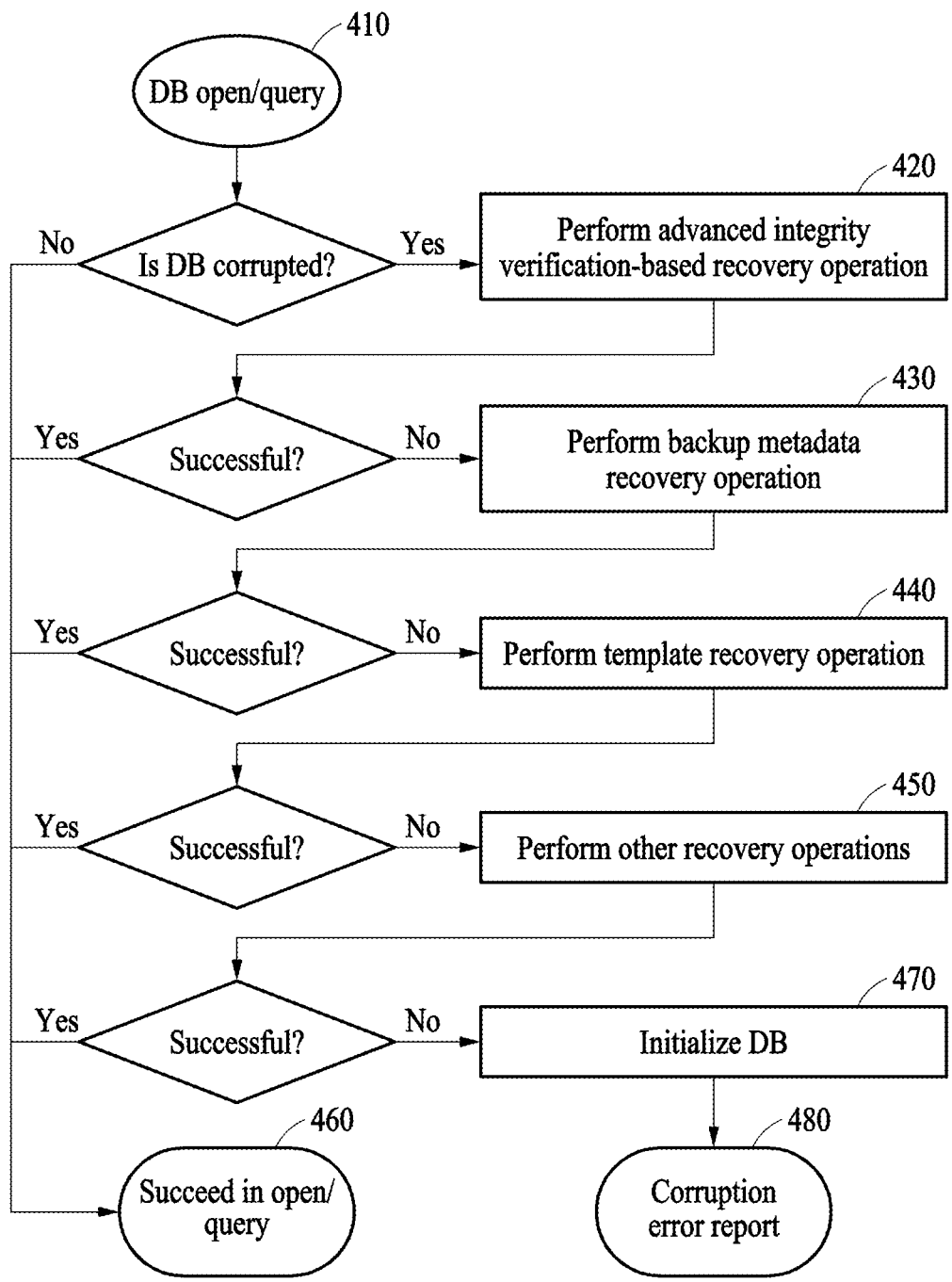
FIG. 4 is a diagram illustrating an operation of recovering a corrupted DB according to an embodiment of the disclosure.

FIG. 4 is a diagram illustrating an operation of recovering a corrupted DB according to an embodiment of the disclosure.

Referring to FIG. 4, it illustrates an example of a recovery operation performed when a DB (e.g., the DB 330 of FIG. 3) is corrupted in an electronic device (e.g., the electronic device 101 of FIGS. 1 and 3) according to one embodiment. The electronic device may include a first memory, a second memory, and a processor (e.g., the processor 120 of FIGS. 1 and 3).

The first memory, which is a non-volatile memory (e.g., the non-volatile memory 134 of FIGS. 1 and 3), may be a mass storage device. For example, the first memory may include at least one of a one time programmable ROM (OTPROM), a programmable ROM (PROM), an erasable PROM (EPROM), an electrically erasable PROM (EEPROM), a mask ROM, a flash ROM, a flash memory, a hard drive, or an SSD. The first memory may store a DB including a variety of data, and the DB may be updated by a transaction according to an operation of the processor.

The second memory may be a volatile memory (e.g., the volatile memory 132 of FIGS. 1 and 3) having attributes different from the first memory. According to one embodiment, at least a partial space of the second memory may be allocated as a main memory. The processor may load or temporarily store data of the first memory in the second memory and may perform an operation of a transaction related to the data temporarily stored in the second memory. The processor may store, in the second memory, journal data including an operation result of a transaction and metadata indicating an address of data to which the transaction is to be reflected.

In the following embodiments, operations may be performed sequentially, but are not necessarily performed sequentially. For example, the order of the operations may be changed and at least two of the operations may be performed in parallel. Operations 410 to 480 may be performed by at least one component (e.g., the processor 120 of FIGS. 1 and 3) of the electronic device.

In operation 410, the processor 120 (e.g., the application 146 of FIGS. 1 to 3) of the electronic device may open the DB or perform a query task. If the DB is corrupted, opening of the DB or the query task may not be completed. The DB may be corrupted due to various causes, such as hardware failures or errors in applications or runtime libraries. Corruption of the DB may be detected by a DB engine (e.g., libsqlite.so), and a corruption event may be received to a DB framework. If the corruption of the DB is detected, operations 420 to 450 may be performed.

In operation 420, the processor 120 (e.g., a DB management system) of the electronic device may perform an advanced integrity verification-based recovery operation. The electronic device may sequentially, individually initialize a DB cache in which at least a portion of the DB is loaded to a user space of the second memory, and an OS cache in which at least a portion of the DB is loaded to a kernel space of the second memory, and may perform integrity check of the DB, to perform a recovery operation. The advanced integrity verification-based recovery operation will be described in detail with reference to FIGS. 5 and 6. If the advanced integrity verification-based recovery operation is successful, the electronic device may open the DB or perform the query task in operation 460. If the advanced integrity verification-based recovery operation fails, operation 430 may be performed.

In operation 430, the processor 120 (e.g., a DB management system) of the electronic device may perform a backup metadata recovery operation. If metadata loaded to the DB cache is corrupted, the electronic device may perform metadata overriding on the DB cache based on backup data of the metadata, to perform a recovery operation. The backup metadata recovery operation will be described in detail with reference to FIGS. 7 to 10. If the backup metadata recovery operation is successful, operation 460 may be subsequently performed. If the backup metadata recovery operation fails, operation 440 may be subsequently performed.

In operation 440, the processor 120 (e.g., a DB management system) of the electronic device may perform a template recovery operation. The electronic device may load template data of metadata to the DB cache and recover the metadata through an in-place update based on the template data. The in-place update may indicate directly updating metadata stored in the DB cache based on template data, within the DB cache. The template recovery operation will be described in detail with reference to FIGS. 11 and 12. If the template recovery operation is successful, operation 460 may be subsequently performed. If the template recovery operation fails, operation 450 may be subsequently performed.

In operation 450, the processor 120 (e.g., a DB management system) of the electronic device may perform other recovery operations. The electronic device may perform ReIndex and/or VACUUM, or may perform a recovery operation based on a table page call module of the DB management system. Here, the ReIndex may indicate an operation of re-generating an index based on a schema. In addition, the table page call module may be a module that calls a page of a predetermined table of the DB management system, and may be, for example, DBdata of SQLite. The other recovery operations will be described in detail with reference to FIG. 13. If the other recovery operations are successful, operation 460 may be subsequently performed. If the other recovery operations fail, operation 470 may be subsequently performed.

In operation 470, the processor 120 (e.g., a DB management system) of the electronic device may initialize the DB that fails to be recovered. If the DB is initialized, user data stored in the DB may be lost. Due to such a loss of the user data, important user data such as contacts, messages, or notes may be deleted. Accordingly, a multi-step runtime recovery scheme may be provided to prevent the DB from being initialized.

In operation 480, the processor 120 (e.g., a DB management system) of the electronic device may report a corruption error. The corruption error report may include, but is not limited to, for example, information about whether corruption of the DB is detected while an operation is being performed, results obtained by performing the multi-step runtime recovery scheme, and a variety of information about a DB initialization operation. The corruption error report may indicate transferring the above-described information to an application that sends a request for a DB open or query task.

Figure 5:
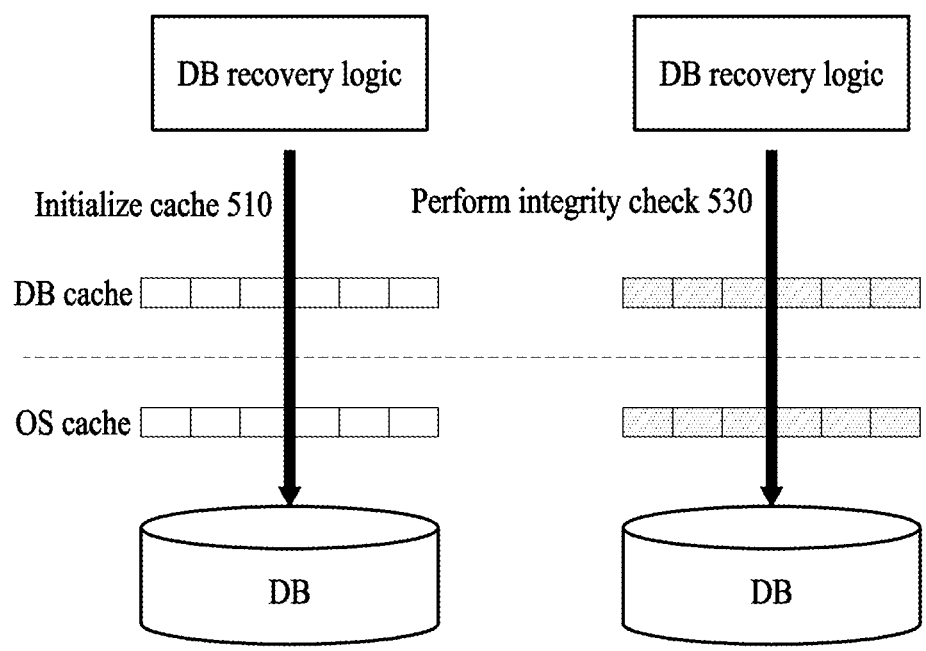
FIGS. 5 and 6 are diagrams illustrating an advanced integrity verification-based recovery operation according to various embodiments of the disclosure.
Figure 6:
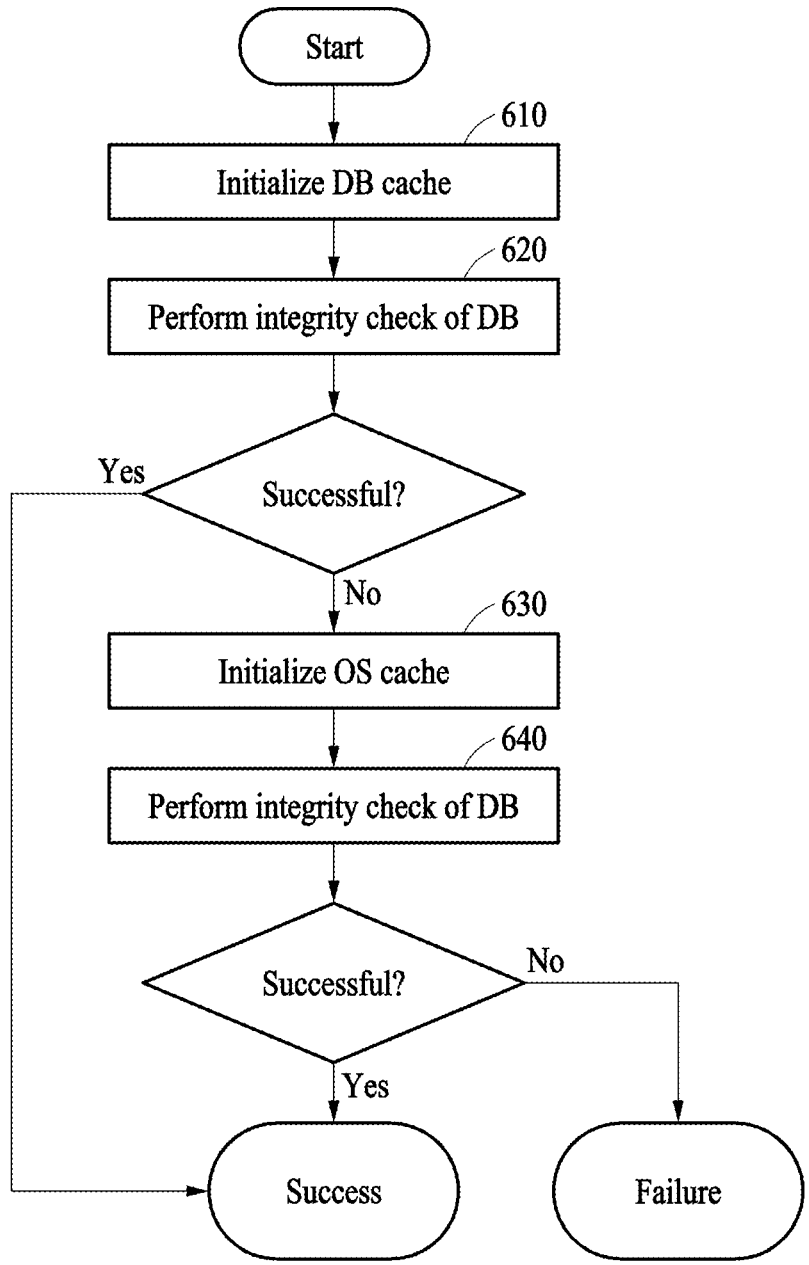

FIGS. 5 and 6 are diagrams illustrating an advanced integrity verification-based recovery operation according to various embodiments of the disclosure.

Referring to FIG. 5, an electronic device (e.g., the electronic device 101 of FIGS. 1 and 3) may determine whether a memory is corrupted, and perform integrity verification, to perform a recovery operation. A DB management system (e.g., SQLite) may use a page cache and a structure memory for an operation of a DB. Corruption of a DB (e.g., the DB 330 of FIG. 3) may be detected due to corruption of a corresponding memory. In this case, a DB itself stored in a first memory may be normal, but an OS cache and/or a DB cache in which at least a portion of the DB is loaded to open the DB and/or perform a query task may be corrupted. The DB cache may be a cache in which at least a portion of the DB is loaded to a user space, and the OS cache may be a cache in which at least a portion of the DB is loaded to a kernel space.

The electronic device may recover the corrupted memory by performing operation 510 of initializing the DB cache or the OS cache and operation 530 of performing integrity check of the DB. In the DB cache and the OS cache, at least a portion of the DB, for which an open or query task is requested, may be loaded, and operating layers may be different from each other. The OS cache may include a kernel page cache of the DB and metadata of a file system (e.g., the file system 320 of FIG. 3). The DB cache may be a cache in which at least a portion of the DB is loaded to a user space of a second memory, and the OS cache may be a cache in which at least a portion of the DB is loaded to a kernel space of the second memory. The DB shown in FIG. 5 may be stored in the first memory. The electronic device may determine whether the corrupted memory is recovered through the integrity check.

FIG. 6 illustrates an advanced integrity verification-based recovery operation performed in an electronic device (e.g., the electronic device 101 of FIGS. 1 and 3) according to an embodiment of the disclosure.

In the following embodiments, operations may be performed sequentially, but are not necessarily performed sequentially. For example, the order of the operations may be changed and at least two of the operations may be performed in parallel. Operations 610 to 640 may be performed by at least one component (e.g., the processor 120 of FIGS. 1 and 3) of the electronic device.

Referring to FIG. 6, in operation 610, the processor 120 (e.g., a DB management system) of the electronic device may initialize a DB cache. For example, the electronic device may clear data loaded to the DB cache and reload at least a portion of a DB (e.g., the DB 330 of FIG. 3). In this example, the electronic device may close and reopen a connection to the DB, or may perform a task of cleaning all internal caches of the DB. If all the internal caches are cleaned, the electronic device may generate a new DB connection.

In operation 620, the processor 120 (e.g., a DB management system) of the electronic device may perform integrity check of the DB after initializing the DB cache. For example, if the DB cache is initialized, consistency check of the DB may be performed. If the consistency check is successful, the integrity check of the DB may be performed.

The conformity check may be performed in various forms. For example, the electronic device may determine whether a response to a query result is received normally by reperforming a query task corresponding to a detection of corruption of the DB. If the response to the query result is received normally, the electronic device may determine that the consistency check is successful. Alternatively, if the corruption of the DB due to a failure to open the DB is detected, the electronic device may reopen the DB. If the DB is opened normally, the consistency check may be determined to be successful.

If the consistency check is successful, the electronic device may perform the integrity check of the DB. For example, when the DB management system is SQLite, the electronic device may perform the integrity check of the DB through an SQL syntax such as [PRAGMA integrity_check (1);]. If the integrity check of the DB is successful, it may be determined that the corruption of the DB is also resolved by recovering the corrupted memory.

If the consistency check of the DB or the integrity check of the DB fails, the electronic device may perform operation 630 by assuming that estimating that a portion other than the DB cache has been corrupted.

In operation 630, the processor 120 (e.g., a DB management system) of the electronic device may initialize an OS cache. For example, the electronic device may clear data loaded to the OS cache and reload at least a portion of the DB. The description of operation 610 may equally apply to a cache initialization, and accordingly further description is not repeated herein.

In operation 640, the processor 120 (e.g., a DB management system) of the electronic device may perform the integrity check of the DB after initializing the OS cache. For example, if the OS cache is initialized, the consistency check of the DB may be performed. If the consistency check is successful, the integrity check of the DB may be performed. The description of operation 630 may equally apply to the consistency check and the integrity check of the DB, and accordingly further description is not repeated herein.

If both the consistency check and the integrity check of the DB are successful after the OS cache is initialized, it may be determined that the corruption of the DB is also resolved by recovering the corrupted memory. If the consistency check of the DB or the integrity check of the DB fails, it may be determined that an integrity verification-based recovery fails.

FIGS. 7 to 10 are diagrams illustrating a backup metadata recovery operation according to various embodiments of the disclosure.

Figure 7:
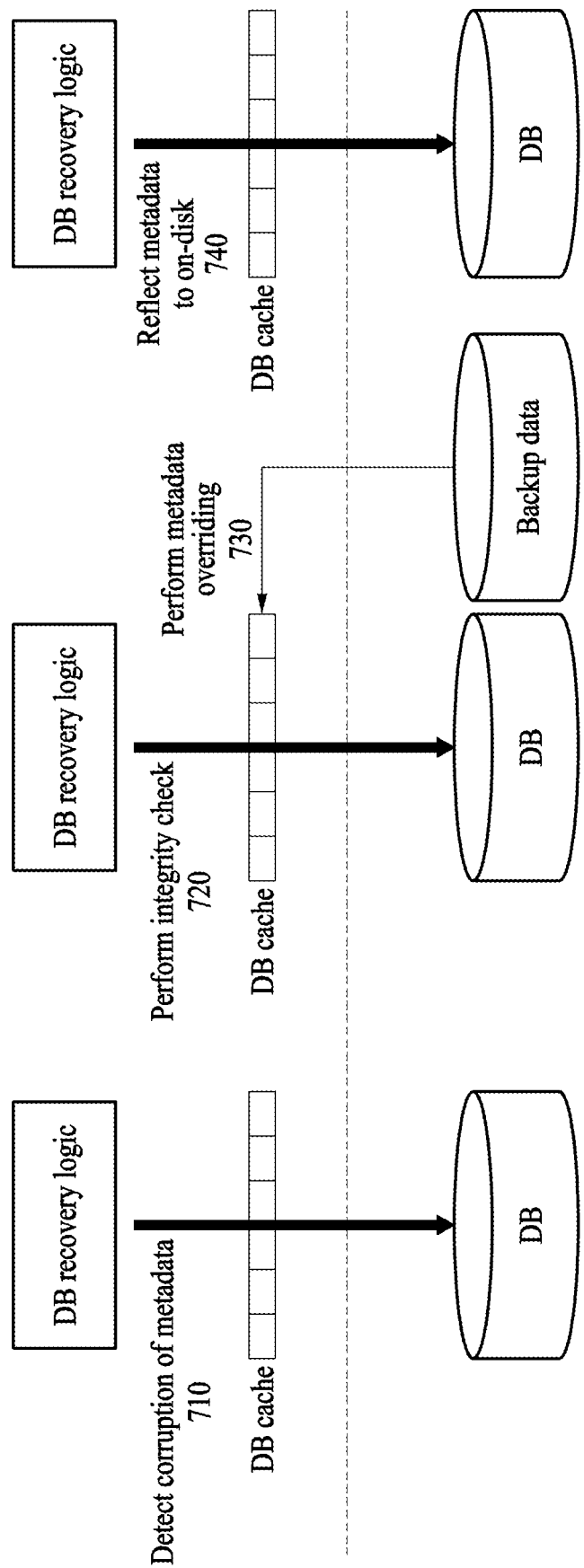
FIGS. 7, 8, 9, and 10 are diagrams illustrating a backup metadata recovery operation according to various embodiments of the disclosure.

Referring to FIG. 7, an electronic device (e.g., the electronic device 101 of FIGS. 1 and 3) may perform the backup metadata recovery operation, when the above-described advanced integrity verification-based recovery operation fails. The electronic device may recover a DB (e.g., the DB 330 of FIG. 3) by performing memory overriding based on metadata that is backed up in advance before corruption.

The electronic device may perform operation 710 of detecting corruption of metadata loaded to a DB cache, operation 720 of performing integrity check of backup data when the backup data is present, operation 730 of performing metadata overriding on the DB cache based on the backup data, and operation 740 of reflecting the metadata loaded to the DB cache to an on-disk.

Figure 8:
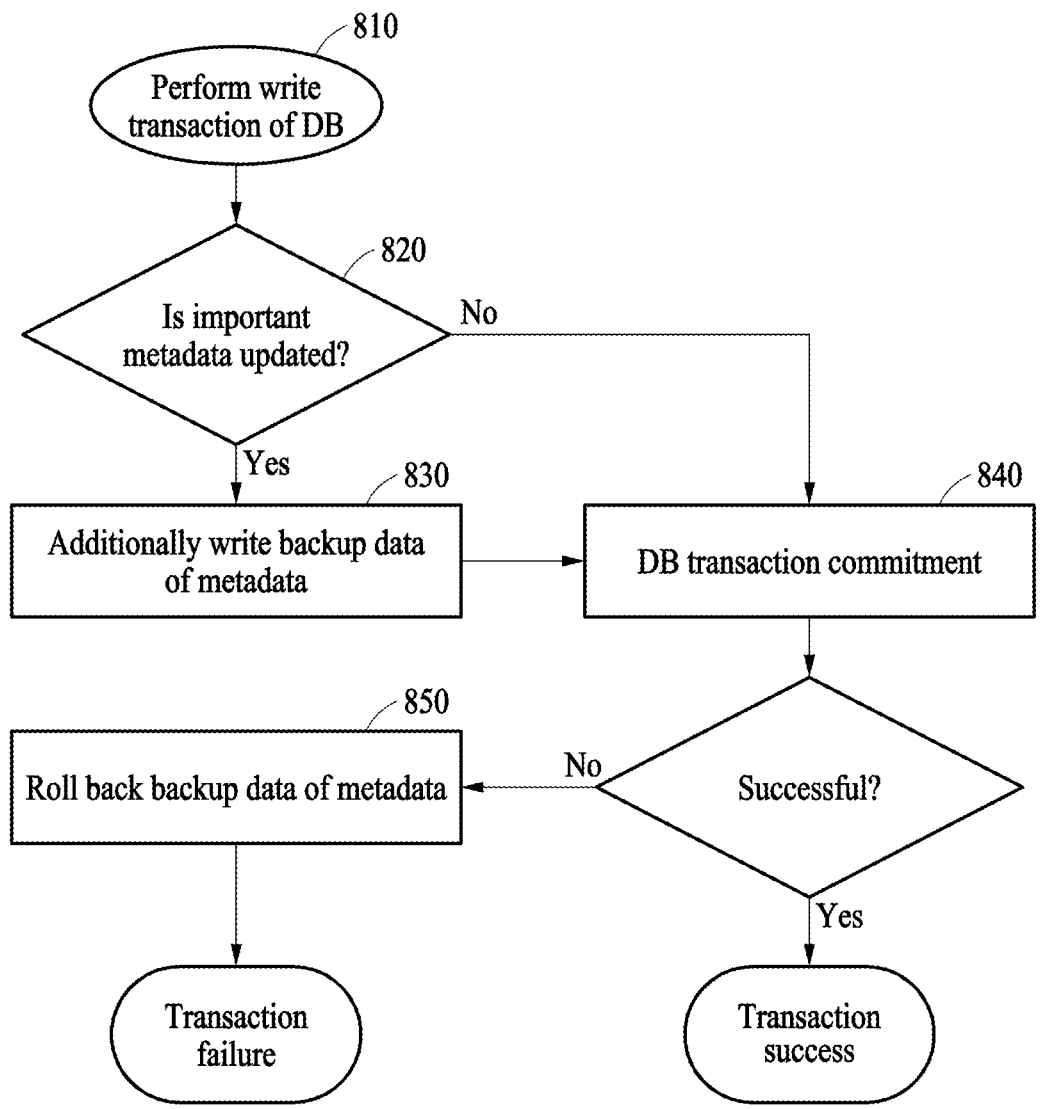

FIG. 8 illustrates an operation of writing backup data of metadata performed in an electronic device (e.g., the electronic device 101 of FIGS. 1 and 3) according to an embodiment of the disclosure.

In the following embodiments, operations may be performed sequentially, but are not necessarily performed sequentially. For example, the order of the operations may be changed and at least two of the operations may be performed in parallel. Operations 810 to 850 may be performed by at least one component (e.g., the processor 120 of FIGS. 1 and 3) of the electronic device.

Referring to FIG. 8, in operation 810, the processor 120 (e.g., the application 146 of FIGS. 1 to 3) of the electronic device may perform a write transaction of a DB (e.g., the DB 330 of FIG. 3) in response to a user request or a system request.

In operation 820, the processor 120 (e.g., a DB management system) of the electronic device may determine whether metadata is updated in the write transaction. Here, the metadata may be important metadata such as a DB header and a DB schema. If the metadata is updated, operation 830 may be subsequently performed. If the metadata is not updated, operation 840 may be subsequently performed.

In operation 830, the processor 120 (e.g., a DB management system) of the electronic device may additionally write backup data of metadata. The backup data may be used for metadata overriding to be performed later.

In operation 840, when the write transaction of the DB is completed, the processor 120 (e.g., a DB management system) of the electronic device may generate a DB transaction commitment indicating that all operations related to data included in a corresponding transaction have been successfully performed.

If the write transaction fails, the processor 120 (e.g., a DB management system) of the electronic device may roll back the backup data of metadata to a previous state in operation 850. In this example, the backup metadata may also return to the previous state, and accordingly the backup metadata may remain the same as metadata of a current DB.

Figure 9:
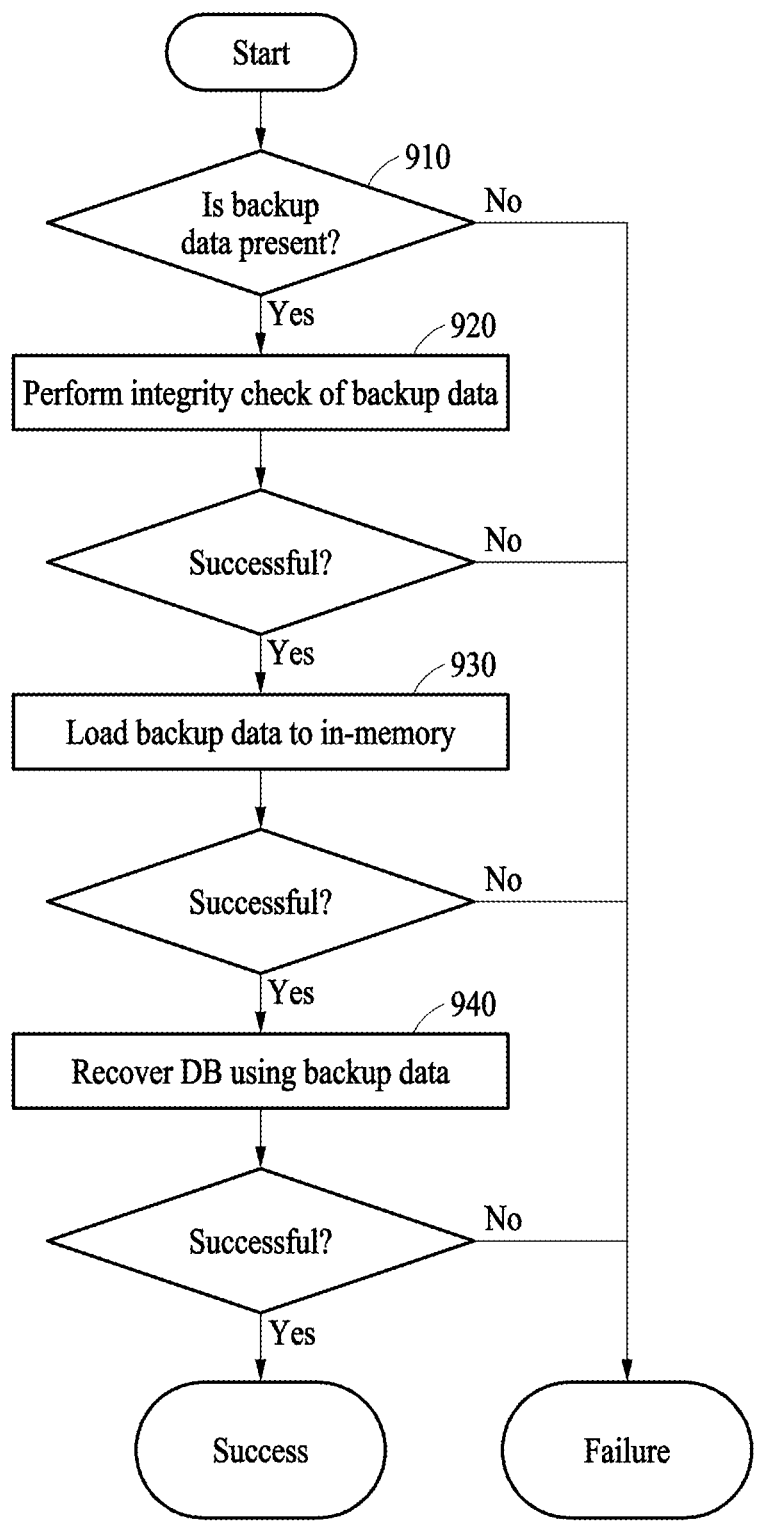

FIG. 9 illustrates a metadata overriding operation performed in an electronic device (e.g., the electronic device 101 of FIGS. 1 and 3) according to an embodiment of the disclosure.

In the following embodiments, operations may be performed sequentially, but are not necessarily performed sequentially. For example, the order of the operations may be changed and at least two of the operations may be performed in parallel. Operations 910 to 940 may be performed by at least one component (e.g., the processor 120 of FIGS. 1 and 3) of the electronic device.

Referring to FIG. 9, in operation 910, when it is determined that metadata in a DB cache is corrupted, the processor 120 (e.g., a DB management system) of the electronic device may determine whether backup data of the metadata is present. If the backup data of the metadata is absent, the backup metadata recovery operation may be terminated. If the backup data of the metadata is present, operation 920 may be subsequently performed.

In operation 920, the processor 120 (e.g., a DB management system) of the electronic device may perform integrity check of the backup data. For example, the electronic device may perform consistency check of the backup data. If the consistency check is successful, the electronic device may perform the integrity check of the backup data. For example, when the backup data is written as a separate file, the consistency check may be performed using a checksum scheme. Also, the above description may equally apply to the consistency check and the integrity check, and accordingly further description is not repeated herein. If both the consistency check and the integrity check of the backup data are successful, operation 930 may be subsequently performed, and otherwise, the backup metadata recovery operation may be terminated.

In operation 930, the processor 120 (e.g., a DB management system) of the electronic device may load the backup data to an in-memory, which may be referred to as a "metadata overriding scheme". Loading of the backup data to the in-memory may indicate loading the backup data to a DB cache. For example, the electronic device may load backup data stored in a non-volatile memory (e.g., the non-volatile memory 134 of FIGS. 1 and 3) to the DB cache. Through the metadata overriding, metadata may be extracted from the backup data and used as runtime data by loading a DB header or DB schema.

If the metadata overriding is successfully performed, operation 940 may be performed, and otherwise, the backup metadata recovery operation may be terminated.

If the metadata overriding is successfully performed, an operation of reading data stored in a first memory may be performed normally even though it is impossible to change data or add data to a DB (e.g., the DB 330 of FIG. 3). Accordingly, a read-only DB connection may be used. To change data or add data to the DB, operation 940 of recovering a currently corrupted DB may be performed.

In operation 940, the processor 120 (e.g., a DB management system) of the electronic device may recover the DB using the backup data. The electronic device may recover the DB based on an in-place update, which will be further described below with reference to FIG. 10.

Figure 10:
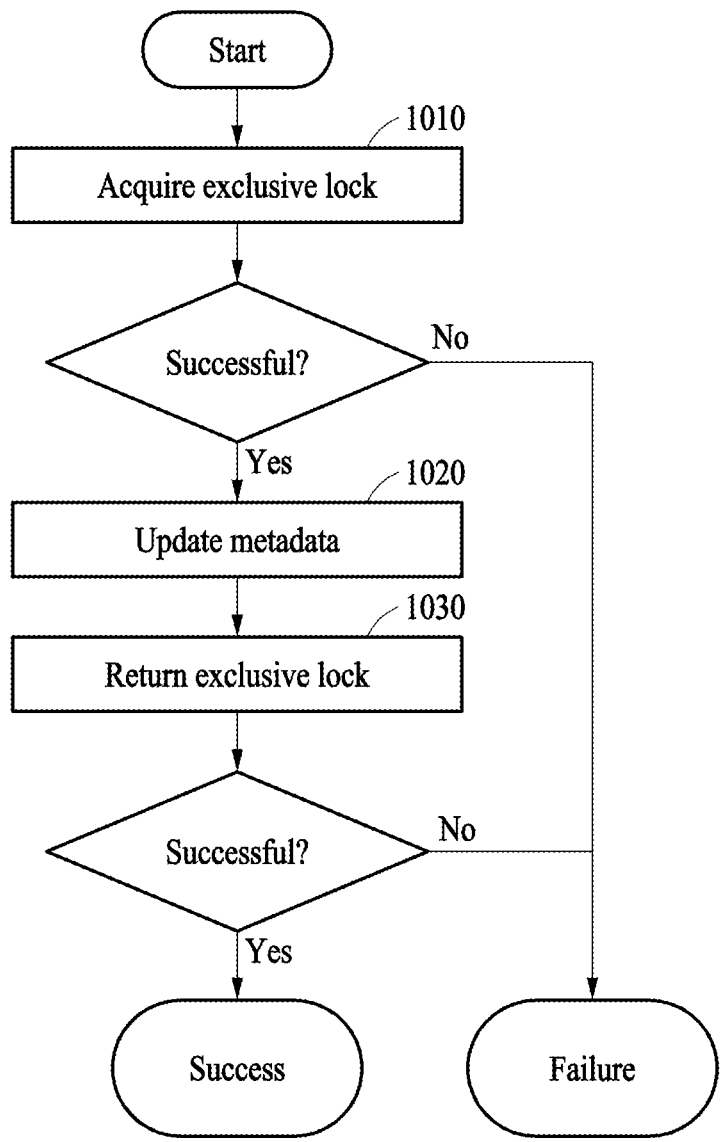

FIG. 10 illustrates an operation of an in-place update of metadata using backup data, performed in an electronic device (e.g., the electronic device 101 of FIGS. 1 and 3) according to an embodiment of the disclosure.

In the following embodiments, operations may be performed sequentially, but are not necessarily performed sequentially. For example, the order of the operations may be changed and at least two of the operations may be performed in parallel. Operations 1010 to 1030 may be performed by at least one component (e.g., the processor 120 of FIGS. 1 and 3) of the electronic device.

Referring to FIG. 10, in operation 1010, the processor 120 (e.g., a DB management system) of the electronic device may acquire an exclusive lock to perform an in-place update. The exclusive lock may prevent other DB connections from being used. The exclusive lock may be a lock to prevent all reads and writes from being used.

In operation 1020, the processor 120 (e.g., a DB management system) of the electronic device may update metadata through the in-place update in a state in which the exclusive lock is acquired. The in-place update may be an operation of rewriting normal metadata extracted from backup data in the same position as a position of the corrupted metadata in a DB (e.g., the DB 330 of FIG. 3). Through the in-place update, corruption of the DB may be resolved.

In operation 1030, the processor 120 (e.g., a DB management system) of the electronic device may return the exclusive lock, when the in-place update is completed.

Figure 11:
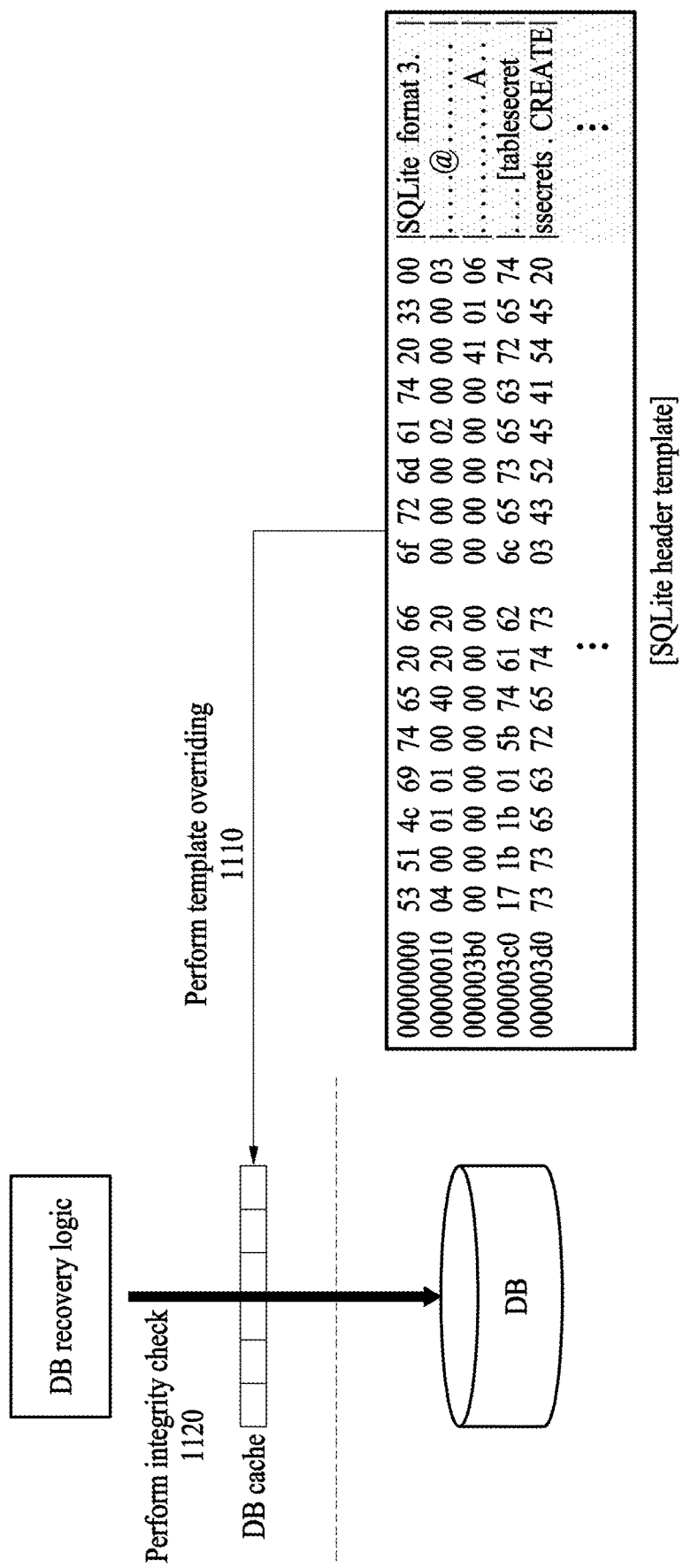
FIGS. 11 and 12 are diagrams illustrating of a template recovery operation according to various embodiments of the disclosure.
Figure 12:
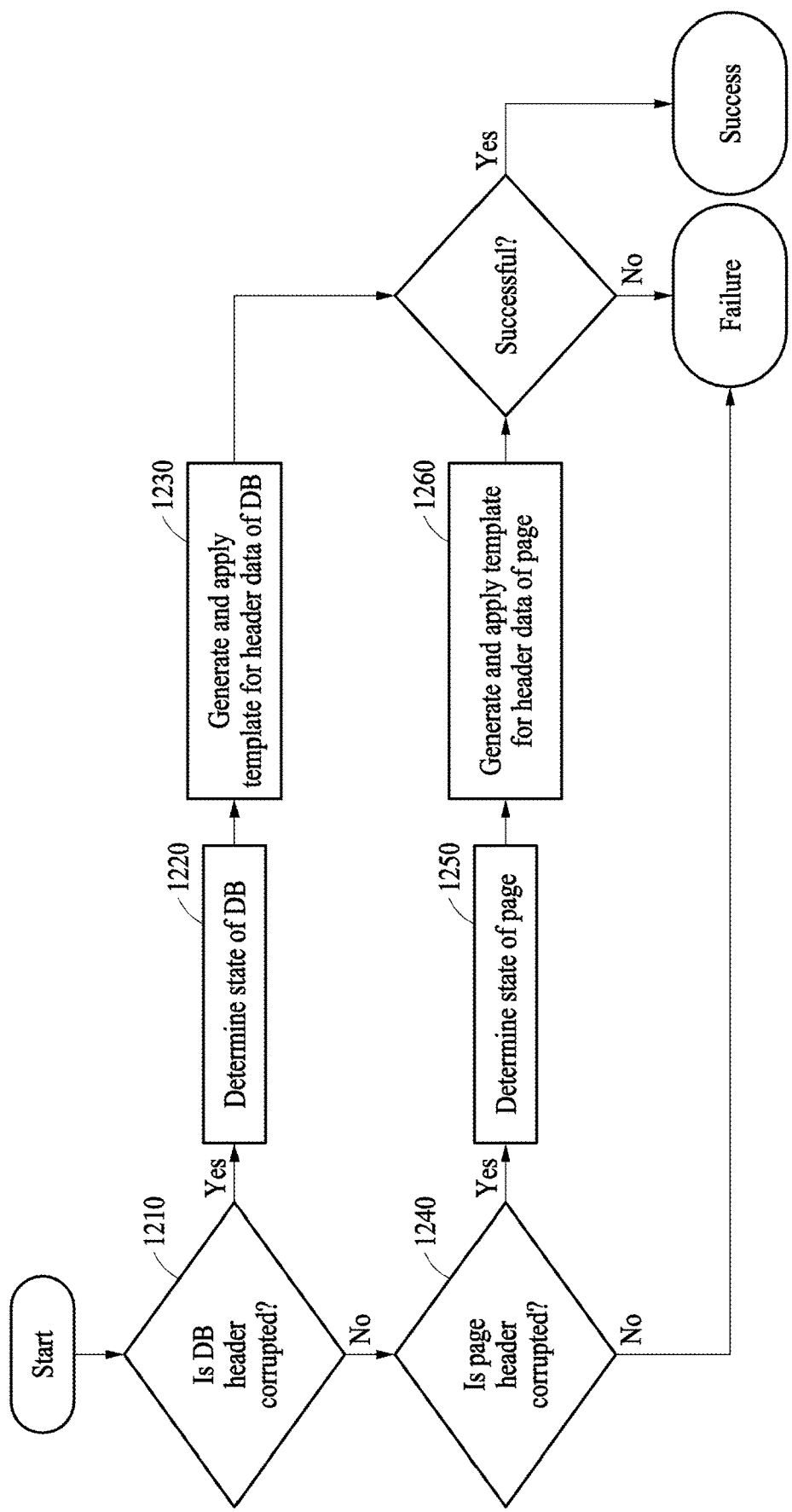

FIGS. 11 and 12 are diagrams illustrating a template recovery operation according to various embodiments of the disclosure.

Referring to FIG. 11, an electronic device (e.g., the electronic device 101 of FIGS. 1 and 3) may perform the template recovery operation when the above-described backup metadata recovery operation fails. For example, when the backup metadata recovery operation fails, for example, when backup data of metadata is absent or when integrity check of the metadata fails, the template recovery operation may be performed.

A header (e.g., a DB header and a page header) of a DB (e.g., the DB 330 of FIG. 3) may have a predefined file format. The electronic device may generate a template suitable for a state of a page or the DB using a corresponding file format and attempt to determine whether recovering of the DB is possible.

The electronic device may perform operation 1110 of performing template overriding on a DB cache based on template data for metadata, and operation 1120 of performing integrity check of template data loaded to the DB cache. If the integrity check of the template data is successful, the electronic device may recover the DB by reflecting the template data loaded to the DB cache to a DB stored in a first memory based on an in-place update.

FIG. 12 illustrates a template recovery operation performed in an electronic device (e.g., the electronic device 101 of FIGS. 1 and 3) according to an embodiment of the disclosure.

In the following embodiments, operations may be performed sequentially, but are not necessarily performed sequentially. For example, the order of the operations may be changed and at least two of the operations may be performed in parallel. Operations 1210 to 1260 may be performed by at least one component (e.g., the processor 120 of FIGS. 1 and 3) of the electronic device.

Referring to FIG. 12, in operation 1210, the processor 120 (e.g., a DB management system) of the electronic device may determine at runtime whether a DB header or a DB page header is corrupted. If the DB header is corrupted, operation 1220 may be subsequently performed. If the DB header is not corrupted, operation 1240 may be subsequently performed.

In operation 1220, the processor 120 (e.g., a DB management system) of the electronic device may determine a state of a DB (e.g., the DB 330 of FIG. 3). For example, the electronic device may determine a DB size as a file size and determine a journal mode based on a presence or absence of a write-ahead logging (WAL) file. The electronic device may apply information that fails to be determined in a current file state as basic header data and may determine whether operating a corresponding file normally is possible.

In operation 1230, the electronic device (processor 120 (e.g., a DB management system)) may generate template data for header data of the DB based on the state of the DB. The electronic device may perform integrity check of the generated template data, and may reflect the template data to the DB through an in-place update when the integrity check of the template data is successful, to recover the DB.

In operation 1240, the processor 120 (e.g., a DB management system) of the electronic device may determine at runtime whether a page header is corrupted. If the page header is corrupted, operation 1250 may be subsequently performed. If the page header is not corrupted, it may be determined that the template recovery operation fails.

In operation 1250, the processor 120 (e.g., a DB management system) of the electronic device may determine a state of a page. For example, the electronic device may identify information about a page type and a parent page. The electronic device may apply information that fails to be determined in a current page state as basic header data and may determine whether operating a corresponding file normally is possible.

In operation 1260, the processor 120 (e.g., a DB management system) of the electronic device may generate template data for header data of the page based on the state of the page. The electronic device may perform integrity check of the generated template data, and may reflect the template data to the DB through the in-place update when the integrity check of the template data is successful, to recover the DB.

As described above, the electronic device may sequentially determine whether the DB header is corrupted and whether the page header is corrupted, may generate template data suitable for each header, and may utilize the template data to recover the DB.

Figure 13:
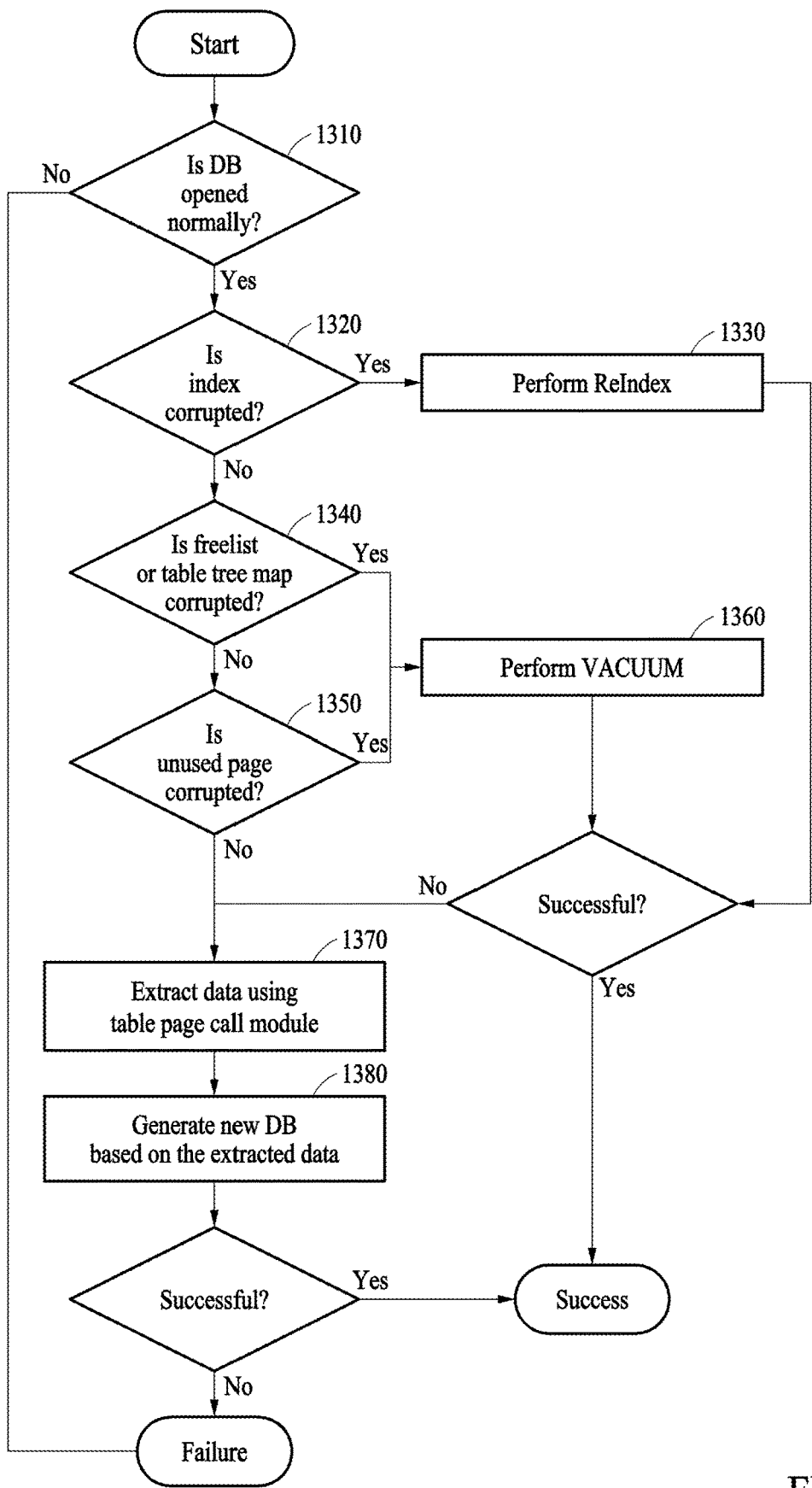
FIG. 13 is a diagram illustrating other recovery operations according to an embodiment of the disclosure.

FIG. 13 is a diagram illustrating other recovery operations according to an embodiment of the disclosure.

Referring to FIG. 13, an electronic device (e.g., the electronic device 101 of FIGS. 1 and 3) may perform other recovery operations when the above-described template recovery operation fails.

In the following embodiments, operations may be performed sequentially, but are not necessarily performed sequentially. For example, the order of the operations may be changed and at least two of the operations may be performed in parallel. Operations 1310 to 1380 may be performed by at least one component (e.g., the processor 120 of FIGS. 1 and 3) of the electronic device.

In operation 1310, the processor 120 (e.g., a DB management system) of the electronic device may determine whether a DB (e.g., the DB 330 of FIG. 3) is opened normally. If all of the above-described recovery operations fail, the electronic device may attempt to recover the DB using various schemes provided by a DB management system (e.g., SQLite). The above schemes may be performed in a state in which a DB connection is opened normally to allow a query task to be performed, and accordingly whether the DB is opened normally may be determined in advance.

In an example, when the DB is opened to allow the query task to be performed normally, information about corruption may be analyzed, and operation 1320 may be subsequently performed. In another example, when the DB is not opened such that the query task is not performed normally, it may be difficult to perform other recovery operations, and the initializing of the DB described with reference to operation 470 of FIG. 4 may be subsequently performed.

In operation 1320, the processor 120 (e.g., a DB management system) of the electronic device may determine whether an index of the DB is corrupted. If it is determined that the index of the DB is corrupted, operation 1330 may be subsequently performed. If it is determined that the index of the DB is not corrupted, operation 1340 may be subsequently performed.

In operation 1330, the processor 120 (e.g., a DB management system) of the electronic device may perform ReIndex on the DB. The ReIndex may be a task of invalidating a current index and generating a new index.

In operation 1340, the processor 120 (e.g., a DB management system) of the electronic device may determine whether a freelist or a table tree map of the DB is corrupted. If it is determined that the freelist or the table tree map is corrupted, operation 1360 may be performed, and otherwise, operation 1350 may be subsequently performed. The freelist may be a list of pages that are not used in the DB. The table tree map may indicate mapping information for managing a table tree, and may be, for example, a ptr map entry of SQLite.

In operation 1350, the processor 120 (e.g., a DB management system) of the electronic device may determine whether an unused page is corrupted. If it is determined that the unused page is corrupted, operation 1360 may be subsequently performed, and otherwise, operation 1370 may be subsequently performed.

In operation 1360, the processor 120 (e.g., a DB management system) of the electronic device may perform VACUUM on the DB. If the VACUUM is performed, a process of transferring content of the DB to a temporary DB once and returning the content to the DB may be performed. Through the process, a task of reconfiguring the DB by sequentially storing data while eliminating an empty space may be performed.

If such corruption is not resolved by ReIndex or VACUUM, the processor 120 (e.g., a DB management system) of the electronic device may extract data from the DB based on a table page call module of the DB management system in operation 1370. The table page call module may have a function of parsing records of each page and transmitting the records as query results, using a scheme of using a virtual table function provided by the DB management system, and may be, for example, SQLite DBdata.

In operation 1380, the processor 120 (e.g., a DB management system) of the electronic device may generate a new DB based on the extracted data. For example, the electronic device may write a new DB by performing INSERT after QUERY.

If it is difficult to recover the corrupted DB using the other recovery operations of FIG. 13, the initializing of the DB described with reference to operation 470 of FIG. 4 may be subsequently performed.

Figure 14:
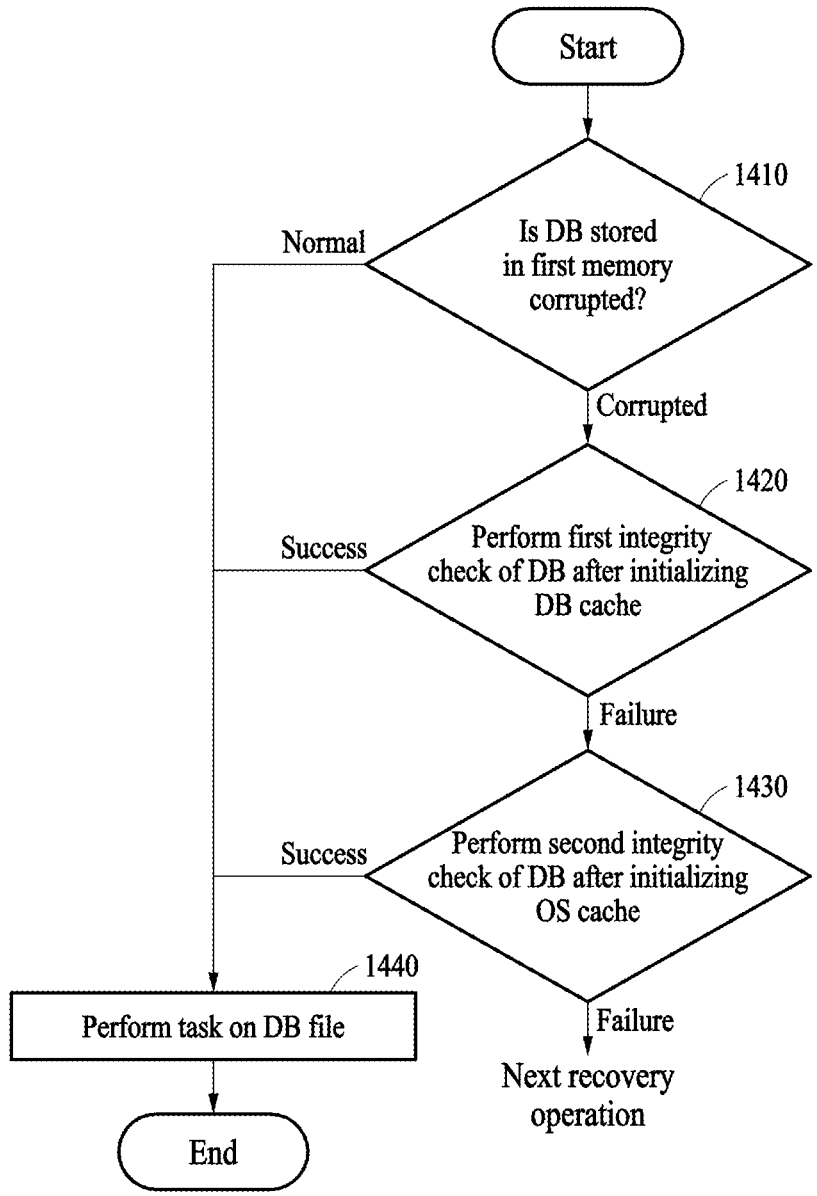
FIG. 14 is a diagram illustrating a method of operating an electronic device according to an embodiment of the disclosure.

FIG. 14 is a diagram illustrating a method of operating an electronic device according to an embodiment of the disclosure.

In the following embodiments, operations may be performed sequentially, but are not necessarily performed sequentially. For example, the order of the operations may be changed and at least two of the operations may be performed in parallel. Operations 1410 to 1440 may be performed by at least one component (e.g., the processor 120 of FIGS. 1 and 3) of an electronic device (e.g., the electronic device 101 of FIGS. 1 and 3).

Referring to FIG. 14, in operation 1410, the processor 120 (e.g., a DB management system) of the electronic device may determine whether a DB (e.g., the DB 330 of FIG. 3) stored in a non-volatile first memory is corrupted.

In operation 1420, when it is determined that the DB is corrupted, the processor 120 (e.g., a DB management system) of the electronic device may perform first integrity check of the DB after initializing a DB cache in which at least a portion of the DB is loaded.

In operation 1430, when the first integrity check of the DB fails, the processor 120 (e.g., a DB management system) of the electronic device may perform second integrity check of the DB after initializing an OS cache in which at least a portion of the DB is loaded.

In operation 1440, the processor 120 (e.g., a DB management system) of the electronic device may perform a task on a DB file, when the first integrity check or the second integrity check of the DB is successful.

If both the first integrity check and the second integrity check of the DB fail, next recovery operations may be subsequently performed. The above description provided with reference to FIGS. 1 to 13 may equally apply to the next recovery operations, and accordingly further description is not repeated herein.

According to one embodiment, a method of operating an electronic device may include determining whether a DB stored in a first memory of the electronic device is corrupted, the first memory being non-volatile, performing first integrity check of the DB after initializing a DB cache in which at least a portion of the DB is loaded to a user space of a second memory of the electronic device, when it is determined that the DB is corrupted, the second memory being volatile, performing second integrity check of the DB after initializing an OS cache in which at least a portion of the DB is loaded to a kernel space of the second memory, when the first integrity check of the DB fails, and performing a task on a DB file, when the first integrity check or the second integrity check of the DB is successful.

According to one embodiment, in the method of operating the electronic device, the performing of the first integrity check of the DB may include performing first consistency check of the DB, and performing the first integrity check of the DB when the first consistency check is successful.

According to one embodiment, in the method of operating the electronic device, the performing of the first integrity check of the DB may include initializing the DB cache by reloading at least a portion of the DB after clearing the DB cache in response to corruption of the DB being detected.

According to one embodiment, the method of operating the electronic device may further include determining whether metadata loaded to the DB cache is corrupted, when the second integrity check of the DB fails, and performing metadata overriding on the DB cache based on backup data of the metadata, when it is determined that the metadata is corrupted.

According to one embodiment, in the method of operating the electronic device, the performing of the metadata overriding on the DB cache may include determining whether backup data of the metadata is present, when it is determined that the metadata is corrupted, performing third integrity check of the backup data, when it is determined that the backup data is present, loading the backup data to the DB cache, when the third integrity check of the backup data is successful, and recovering the metadata through an in-place update based on the backup data.

According to one embodiment, in the method of operating the electronic device, the in-place update may be performed by rewriting metadata extracted from the backup data in the same position as a position of the corrupted metadata in a state in which an exclusive lock on the DB is acquired. The exclusive lock may be returned when the in-place update is completed.

According to one embodiment, in the method of operating the electronic device, the backup data may be determined based on determining whether the metadata is updated when a write transaction is performed on the DB, generating backup data of the metadata, when the metadata is updated, and rolling back the backup data to a previous state, when the generating of the backup data fails.

According to one embodiment, the method of operating the electronic device may further include loading template data of the metadata to the DB cache, when the backup data of the metadata is absent or when third integrity check of the backup data fails, and recovering the metadata through an in-place update based on the template data.

Figure 15:
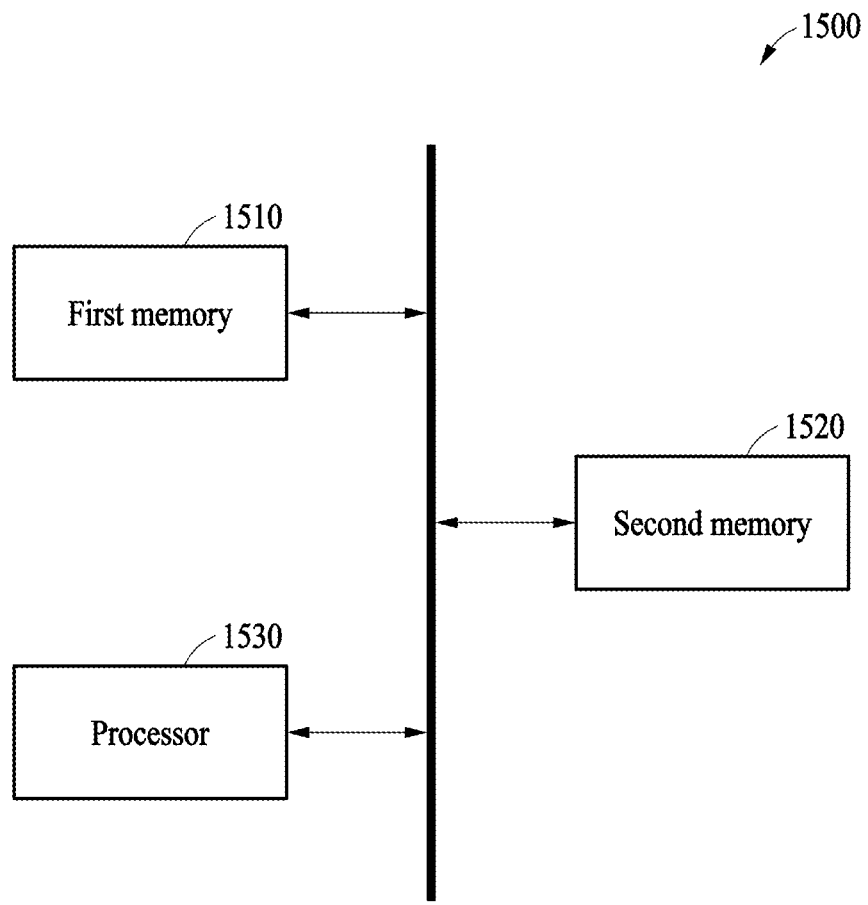
FIG. 15 is a diagram illustrating an electronic device according to an embodiment of the disclosure.

FIG. 15 is a diagram illustrating an electronic device according to an embodiment of the disclosure.

Referring to FIG. 15, an electronic device 1500 (e.g., the electronic device 101 of FIGS. 1 and 3) may include a first memory 1510, a second memory 1520, and a processor 1530 (e.g., the processor 120 of FIGS. 1 and 3).

The electronic device 1500 according to one embodiment may be implemented as a user terminal. The user terminal may include, for example, various computing devices such as a mobile phone, a smartphone, a tablet computer, a laptop, a PC, or an e-book device, various wearable devices such as a smart watch, smart eyeglasses, an HMD, or smart clothes, various home appliances such as a smart speaker, a smart television (TV), or a smart refrigerator, and other devices such as a smart vehicle, a smart kiosk, an Internet of things (IoT) device, a walking assist device (WAD), a drone, or a robot.

The first memory 1510, which is a non-volatile memory (e.g., the non-volatile memory 134 of FIGS. 1 and 3), may be a mass storage device. The first memory 1510 may store a DB (e.g., the DB 330 of FIG. 3) including a variety of data, and the DB may be updated by a transaction according to an operation of the processor 1530.

The second memory 1520 may be a volatile memory (e.g., the volatile memory 132 of FIGS. 1 and 3) having attributes different from the first memory 1510. According to one embodiment, at least a partial space of the second memory 1520 may be allocated as a main memory. The processor 1530 may load or temporarily store data of the first memory 1510 in the second memory 1520, and may perform an operation of a transaction related to the data temporarily stored in the second memory 1520.

The processor 1530 may determine whether the DB is corrupted. When it is determined that the DB is corrupted, the processor 1530 may perform first integrity check of the DB after initializing a DB cache in which at least a portion of the DB is loaded. When the first integrity check of the DB fails, the processor 1530 may perform second integrity check of the DB after initializing an OS cache in which at least a portion of the DB is loaded. When the first integrity check or the second integrity check of the DB is successful, the processor 1530 may perform a task on a DB file. The DB cache may be a cache in which at least a portion of the DB is loaded to a user space of the second memory 1520, and the OS cache may be a cache in which at least a portion of the DB is loaded to a kernel space of the second memory 1520.

In addition, the electronic device 1500 may process the operations described above.

According to one embodiment, the electronic device 1500 may include a non-volatile first memory 1510 configured to store a DB, a volatile second memory 1520, and a processor 1530 operably connected to first memory 1510 and the second memory 1520. The processor 1530 may determine whether the DB is corrupted. When it is determined that the DB is corrupted, the processor 1530 may perform first integrity check of the DB after initializing a DB cache in which at least a portion of the DB is loaded to the user space of the second memory 1520. When the first integrity check of the DB fails, the processor 1530 may perform second integrity check of the DB after initializing an OS cache in which at least a portion of the DB is loaded to the kernel space of the second memory 1520. When the first integrity check or the second integrity check of the DB is successful, the processor 1530 may perform a task on a DB file.

According to one embodiment, the processor 1530 of the electronic device 1500 may perform first consistency check of the DB after initializing the DB cache, and perform the first integrity check of the DB when the first consistency check is successful.

According to one embodiment, the processor 1530 of the electronic device 1500 may initialize the DB cache by reloading at least a portion of the DB after clearing the DB cache in response to corruption of the DB being detected.

According to one embodiment, the processor 1530 of the electronic device 1500 may determine whether metadata loaded to the DB cache is corrupted, when the second integrity check of the DB fails, and perform metadata overriding on the DB cache based on backup data of the metadata, when it is determined that the metadata is corrupted.

According to one embodiment, the processor 1530 of the electronic device 1500 may determine whether backup data of the metadata is present, when it is determined that metadata is corrupted, perform third integrity check of the backup data, when it is determined that the backup data is present, load the backup data to the DB cache, when the third integrity check of the backup data is successful, and recover the metadata through an in-place update based on the backup data.

According to one embodiment, in the electronic device 1500, the in-place update may be performed by rewriting metadata extracted from the backup data in the same position as a position of the corrupted metadata in a state in which an exclusive lock on the DB is acquired. The exclusive lock may be returned when the in-place update is completed.

According to one embodiment, in the electronic device 1500, the backup data may be determined based on determining whether the metadata is updated, when a write transaction is performed on the DB, generating backup data of the metadata, when the metadata is updated, and rolling back the backup data to a previous state, when the generating of the backup data fails.

According to one embodiment, the processor 1530 of the electronic device 1500 may load template data of the metadata to the DB cache, when the backup data of the metadata is absent or when third integrity check of the backup data fails, and may recover the metadata through an in-place update based on the template data.

According to one embodiment, the processor 1530 of the electronic device 1500 may determine whether header data of the DB is corrupted, when the backup data of the metadata is absent or when the third integrity check of the backup data fails, may generate template data for the header data of the DB based on a state of the DB, when it is determined that the header data of the DB is corrupted, may determine whether header data of a page in the DB is corrupted, when it is determined that the header data of the DB is not corrupted, and generate template data for the header data of the page based on a state of the page, when it is determined that the header data of the page is corrupted.

According to one embodiment, the processor 1530 of the electronic device 1500 may determine whether the DB is opened normally, when recovering of the metadata based on the template data fails, may determine whether an index of the DB is corrupted, when it is determined that the DB is opened normally, may perform ReIndex on the DB, when it is determined that the index of the DB is corrupted, may determine whether a freelist or a table tree map for the DB is corrupted and/or whether an unused page is corrupted, when it is determined that the index of the DB is not corrupted, and may perform VACUUM on the DB, when it is determined that the freelist or the table tree map is corrupted or that the unused page is corrupted.

According to one embodiment, the processor 1530 of the electronic device 1500 may determine whether the DB is opened normally, may extract data from the DB based on a table page call module of a DB management system that is capable of using the DB, when the table page call module is present, and may generate a new DB based on the extracted data While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
first memory storing a database (DB), the first memory being non-volatile;
second memory storing at least a portion of the DB, the second memory being volatile;
third memory storing one or more computer programs; and
one or more processors operably connected to the first memory, the second memory, and the third memory,
wherein the one or more computer programs include computer-executable instructions that, when executed by the one or more processors individually or collectively, cause the electronic device to:
determine whether the DB is corrupted,
in case that the DB is corrupted:
initialize a DB cache in a user space of the second memory, which includes to load a first portion of the at least a portion of the DB to the user space of the second memory,
perform a first consistency check of the first portion of the at least a portion of the DB after initializing the DB cache, and
perform a first integrity check of the first portion of the at least a portion of the DB on the user space of the second memory when the first consistency check is successful,
in case that the first consistency check or the first integrity check of the DB fails:
initialize an operating system (OS) cache in a kernel space of the second memory, which includes to load a second portion of the at least a portion of the DB to the kernel space of the second memory, and
perform a second integrity check of the DB on the kernel space of the second memory, and
perform a task on a DB file, when the first integrity check or the second integrity check of the DB is successful.

2. The electronic device of claim 1, wherein the one or more computer programs further include computer-executable instructions that, when executed by the one or more processors individually or collectively, cause the electronic device to initialize the DB cache by reloading the first portion of the at least a portion of the DB after clearing the DB cache in response to corruption of the DB being detected.

3. The electronic device of claim 1, wherein the one or more computer programs further include computer-executable instructions that, when executed by the one or more processors individually or collectively, cause the electronic device to:
determine whether metadata loaded to the DB cache is corrupted, when the second integrity check of the DB fails, and
perform metadata overriding on the DB cache based on backup data of the metadata, when it is determined that the metadata is corrupted.

4. The electronic device of claim 3, wherein the one or more computer programs further include computer-executable instructions that, when executed by the one or more processors individually or collectively, cause the electronic device to:
determine whether the backup data of the metadata is present, when it is determined that the metadata is corrupted,
perform a third integrity check of the backup data, when it is determined that the backup data is present,
load the backup data to the DB cache, when the third integrity check of the backup data is successful, and
recover the metadata through an in-place update based on the backup data.

5. The electronic device of claim 4,
wherein the in-place update is performed by rewriting metadata extracted from the backup data in a same position as a position of the corrupted metadata in a state in which an exclusive lock on the DB is acquired, and
wherein the exclusive lock is returned when the in-place update is completed.

6. The electronic device of claim 3, wherein the backup data of the metadata is determined based on:
determining whether the metadata is updated, when a write transaction is performed on the DB,
generating the backup data of the metadata, when the metadata is updated, and
rolling back the backup data to a previous state, when the generating of the backup data fails.

7. The electronic device of claim 3, wherein the one or more computer programs further include computer-executable instructions that, when executed by the one or more processors individually or collectively, cause the electronic device to:
load template data of the metadata to the DB cache, when the backup data of the metadata is absent or when a third integrity check of the backup data fails, and
recover the metadata through an in-place update based on the template data.

8. The electronic device of claim 7, wherein the one or more computer programs further include computer-executable instructions that, when executed by the one or more processors individually or collectively, cause the electronic device to:
determine whether header data of the DB is corrupted, when the backup data of the metadata is absent or when the third integrity check of the backup data fails,
generate template data for the header data of the DB based on a state of the DB, when it is determined that the header data of the DB is corrupted,
determine whether header data of a page in the DB is corrupted, when it is determined that the header data of the DB is not corrupted, and
generate template data for the header data of the page based on a state of the page, when it is determined that the header data of the page is corrupted.

9. The electronic device of claim 7, wherein the one or more computer programs further include computer-executable instructions that, when executed by the one or more processors individually or collectively, cause the electronic device to:
determine whether the DB is opened normally, when recovering of the metadata based on the template data fails,
determine whether an index of the DB is corrupted, when it is determined that the DB is opened normally,
perform ReIndex on the DB, when it is determined that the index of the DB is corrupted,
determine whether a freelist or a table tree map for the DB is corrupted and/or whether an unused page is corrupted, when it is determined that the index of the DB is not corrupted; and
perform VACUUM on the DB, when it is determined that the freelist or the table tree map is corrupted or that the unused page is corrupted.

10. The electronic device of claim 9, wherein the one or more computer programs further include computer-executable instructions that, when executed by the one or more processors individually or collectively, cause the electronic device to:
determine whether the DB is opened normally,
extract data from the DB based on a table page call module of a DB management system, when the table page call module is present, and
generate a new DB based on the extracted data.

11. A method of operating an electronic device, the method comprising:
determining whether a database (DB) stored in a first memory of the electronic device is corrupted, the first memory being non-volatile;
in case that the DB is corrupted:
initializing a DB cache in a user space of a second memory of the electronic device, wherein the second memory stores at least a portion of the DB when the DB was determined to be corrupted, and wherein the initializing of the DB cache includes loading a first portion of the at least a portion of the DB to the user space of the second memory;
performing a first consistency check of the first portion of the at least a portion of the DB after initializing the DB cache; and
performing a first integrity check of the first portion of the at least a portion of the DB on the user space of the second memory when the first consistency check is successful;
in case that the first consistency check or the first integrity check of the DB fails:
initializing an operating system (OS) cache in a kernel space of the second memory, wherein the initializing of the OS cache includes loading a second portion of the at least a portion of the DB to the kernel space of the second memory; and
performing a second integrity check of the DB on the kernel space of the second memory; and
performing a task on a DB file, when the first integrity check or the second integrity check of the DB is successful.

12. The method of claim 11, wherein the performing of the first integrity check of the DB comprises initializing the DB cache by reloading the first portion of the at least a portion of the DB after clearing the DB cache in response to corruption of the DB being detected.

13. The method of claim 11, further comprising:
determining whether metadata loaded to the DB cache is corrupted, when the second integrity check of the DB fails; and
performing metadata overriding on the DB cache based on backup data of the metadata, when it is determined that the metadata is corrupted.

14. The method of claim 13, wherein the performing of the metadata overriding on the DB cache comprises:
determining whether the backup data of the metadata is present, when it is determined that the metadata is corrupted;
performing a third integrity check of the backup data, when it is determined that the backup data is present;
loading the backup data to the DB cache, when the third integrity check of the backup data is successful; and
recovering the metadata through an in-place update based on the backup data.

15. The method of claim 13, wherein the backup data of the metadata is determined based on:
determining whether the metadata is updated when a write transaction is performed on the DB;
generating the backup data of the metadata, when the metadata is updated; and rolling back the backup data to a previous state, when the generating of the backup data fails.

16. One or more non-transitory computer-readable storage media storing one or more computer programs including computer-executable instructions that, when executed by one or more processors of an electronic device individually or collectively, cause the electronic device to perform operations, the operations comprising to:

determine whether a database (DB) stored in first memory of the electronic device is corrupted, the first memory being non-volatile, in case that the DB is corrupted:

initialize a DB cache in a user space of a second memory of the electronic device, wherein the second memory stores at least a portion of the DB when the DB was determined to be corrupted, and wherein to initialize the DB cache includes to load a first portion of the at least a portion of the DB to the user space of the second memory, perform a first consistency check of the first portion of the at least a portion of the DB after initializing the DB cache, and perform a first integrity check of the first portion of the at least a portion of the DB on the user space of the second memory when the first consistency check is successful, in case that the first consistency check or the first integrity check of the DB fails:

initialize an operating system (OS) cache in a kernel space of the second memory, wherein to initialize the OS cache includes to load a second portion of the at least a portion of the DB to the kernel space of the second memory, and perform a second integrity check of the DB on the kernel space of the second memory, and perform a task on a DB file, when the first integrity check or the second integrity check of the DB is successful.

17. The method of claim 15, wherein the determining of whether the metadata is updated comprises determining whether a specific portion of the metadata is updated, and wherein the specific portion comprises at least one of a DB header or a DB schema.

18. The method of claim 17, further comprising:

indicating a DB write transaction commitment, in case that the specific portion of the metadata is updated and the generating of the backup data succeeds.

* * * * *